United States Patent
Huang et al.

(10) Patent No.: US 11,902,198 B2
(45) Date of Patent: Feb. 13, 2024

(54) CONTROLLING DL MIMO TRANSMISSIONS IN A COMMUNICATION SYSTEM

(71) Applicant: GOOGLE LLC, Mountain View, CA (US)

(72) Inventors: Clement Huang, Taipei (TW); Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/629,778

(22) PCT Filed: Jul. 16, 2020

(86) PCT No.: PCT/US2020/042231
§ 371 (c)(1),
(2) Date: Jan. 24, 2022

(87) PCT Pub. No.: WO2021/016023
PCT Pub. Date: Jan. 28, 2021

(65) Prior Publication Data
US 2022/0278796 A1    Sep. 1, 2022

Related U.S. Application Data

(60) Provisional application No. 62/878,292, filed on Jul. 24, 2019.

(51) Int. Cl.
*H04B 7/02* (2018.01)
*H04L 5/00* (2006.01)
(Continued)

(52) U.S. Cl.
CPC ......... *H04L 5/0048* (2013.01); *H04B 7/0417* (2013.01); *H04B 7/0456* (2013.01)

(58) Field of Classification Search
CPC .... H04L 5/0048; H04B 7/0417; H04B 7/0456
(Continued)

(56) References Cited

U.S. PATENT DOCUMENTS

2014/0153427 A1    6/2014    Seo et al.
2017/0302480 A1    10/2017    Kim et al.
(Continued)

FOREIGN PATENT DOCUMENTS

| CN | 101803229 A | 8/2010 |
|----|-------------|--------|
| CN | 102598731 A | 7/2012 |
| WO | WO-2013/181219 A2 | 12/2013 |

OTHER PUBLICATIONS

International Search Report and Written Opinion for Application No. PCT/US2020/042231, dated Sep. 21, 2020.
(Continued)

*Primary Examiner* — Zewdu A Kassa
(74) *Attorney, Agent, or Firm* — MARSHALL, GERSTEIN & BORUN LLP

(57) ABSTRACT

To control transmissions to a user equipment (UE) over a downlink (DL) multiple-input, multiple-output (MIMO) channel, a base station determining that the UE is configured to support N DL MIMO layers and transmit reference signals over L antenna chains (852). In response to determining that L<N (870), the base station generates channel information for the DL MIMO channel using (i) L uplink reference signals, each transmitted by the UE over a respective one of the L antenna chains (880), and (ii) one or more additional transmissions received from the UE (882). The base station transmits data streams over the DL MIMO channel in accordance with the generated channel information.

20 Claims, 15 Drawing Sheets

(51) Int. Cl.
*H04B 7/0417* (2017.01)
*H04B 7/0456* (2017.01)

(58) Field of Classification Search
USPC ........ 375/267, 262, 261, 259, 295, 219, 316
See application file for complete search history.

(56) References Cited

U.S. PATENT DOCUMENTS

| | | |
|---|---|---|
| 2018/0019795 A1 | 1/2018 | Zhang et al. |
| 2019/0159049 A1 | 5/2019 | Kim et al. |
| 2019/0199553 A1 | 6/2019 | Park et al. |
| 2020/0412504 A1* | 12/2020 | Wu .......................... H04B 7/08 |

OTHER PUBLICATIONS

Huawei et al., "Partial Reciprocity Based CSI Acquisition Mechanism," 3GPP Draft (2017).
International Preliminary Report on Patentability for PCT/US2020/042231, dated Oct. 25, 2021.
First Office Action for Chinese Application No. 202080059976.X, dated Oct. 21, 2023.
Sano et al., "LTE-Advanced Release 13 Multiple Antenna Technologies and Improved Reception Technologies," NTT DOCOMO Technical Journal, 18(2):62-71 (2016).

\* cited by examiner

CONTROLLING DL MIMO TRANSMISSIONS IN A COMMUNICATION SYSTEM

This disclosure relates generally to wireless communications and, more particularly, to efficiently using a multiple-input, multiple-output communication channel in the downlink direction from a base station to a user device.

BACKGROUND

One of the techniques that allows wireless communication devices to utilize the available bandwidth more efficiently is multiple-input, multiple-output (MIMO) communications. According to MIMO techniques, a transmitting device transmits over multiple antennas, and the receiving device receives over multiple antennas. For example, a base station that supports a 5G New Radio (NR) radio access technology (RAT) can transmit multiple data streams using multiple transmit (Tx) antenna chains to a user equipment (UE) equipped with multiple receive (Rx) antenna chains, over a downlink (DL) MIMO channel. The UE can transmit over multiple Tx chains to the multiple Rx chains of the base station over an uplink (UL) MIMO channel.

In order for the base station to utilize the DL MIMO channel effectively, the base station and/or the UE can perform channel estimation for coherent demodulation and interference mitigation. To this end, the base station can "sound" the channel by transmitting predefined reference signals, such as demodulation reference signals (DM-RSs) and/or channel state information reference signals (CSI-RSs), over various Tx chains in the downlink direction to the UE, and the UE can measure the quality of the received reference signals and report channel status to the base station in the form of so-called channel state information (CSI), for example. The CSI information is made up of various parameters including an indication of how many streams, or DL MIMO layers, the UE suggests the base station use. For example, a UE can include four Rx chains and suggest that the base station use four DL MIMO layers. Using the CSI information, the base station can select or generate a suitable precoding matrix, or a set of parameters that indicate which weights (e.g., phase, gain) the base station should apply to data streams during transmission over the DL MIMO channel for a given precoding matrix. The CSI also can include a channel quality indicator (CQI) to help the base station identify a suitable modulation and coding scheme (MCS).

In some cases, the base station and the UE share the same frequencies for downlink and uplink transmissions using time division duplexing (TDD), for example. To assess the DL channel, the base station and the UE can exploit channel reciprocity. More specifically, the UE can "sound" the MIMO channel by transmitting reference signals in the uplink direction, and the base station can measure the quality of these uplink reference signals to assess the quality of the UL MIMO channel, and use this assessment to estimate the quality of the DL MIMO channel.

However, a UE does not always have the same number of Rx and Tx chains, e.g., the UE can have more Rx chains than Tx chains. A UE in these can include a switch for operating one or more Rx antennas in a transmission mode for the purposes of transmitting uplink reference signals. For example, a UE can have a one-transmitter-four-receiver (1T4R) configuration and a one-to-four antenna switch selector that allows the UE to transmit the same or different information via each of the Rx antennas in different time periods (e.g., OFDM symbols, time slots, subframes, frames). In another implementation, the switching capability of the UE is limited to only a subset of the Rx chains, e.g., the UE can use only two of the four Rx chains for transmission.

Due to these implementation constraints, the base station and the UE cannot always use uplink reference signals to assess all the layers of a DL MIMO channel. As a more particular example, a UE can include four Rx chains and support four DL MIMO layers, but the switch allows the UE to operate only two of these chains as Tx chains, and thus transmit uplink reference signals over only two of the chains. As a result, the base station estimates the DL MIMO channel for only two layers and transmits information to the UE over a two-layer, rather than a four-layer, DL MIMO channel.

SUMMARY

Generally speaking, the techniques of this disclosure improve channel estimation for coherent demodulation and mitigating interference from multiple transmission antennas. In particular, a base station determines how many DL MIMO layers the UE supports (N) and how many Rx chains the UE can utilize (L) for transmitting uplink reference signals. The number of DL MIMO layers the UE supports corresponds to the number of Rx chains, and the UE can implement antenna switching to transmit uplink reference signals over some or all of the Rx chains. The base station can receive an indication of UE MIMO capability from the UE, another base station, or the core network for example. The base station then configures the UE to transmit uplink reference signals, receive downlink reference signals and generate channel state information, or both, in view of the parameters N and L. The base station obtains channel information based on uplink reference signals the UE transmits over the L Rx chains along with one or more other transmissions such as additional uplink reference signals transmitted over some of the same L Rx chains, one or more transmissions over a physical uplink channel, channel state information generated based on downlink reference signals, etc.

The uplink reference signals can be sounding reference signals (SRSs), and the downlink reference signals can be CSI-RSs. In some implementations, the base station configures the UE to transmit respective SRS transmissions for the L Rx chains and generate CSI based on N-L CSI-RS transmissions. In other implementations, the base station configures the UE to transmit respective SRS transmissions for the L Rx chains and generate CSI based on N CSI-RS transmissions. In still other implementations, the base station can use transmissions over physical uplink channels such as scheduling requests, HARQ positive acknowledgements, or HARQ negative acknowledgements.

The base station can generate a V_PMI precoding matrix based on the CSI, generate multiple precoding matrices V' based on (i) the SRS transmissions and (ii) predefined values (e.g., 1+j, 1−j) or other transmissions (additional SRS transmissions, data unit transmitted over physical uplink channels, etc.) for the missing matrix elements, and select a precoding matrix V closest to the V_PMI matrix.

Further, in various implementations, the base station can configure the UE to transmit SRSs, receive CSI-RSs, etc. prior to determining that L<N or subsequently to determining that L<N.

One example embodiment of these techniques is a method in a base station for controlling transmissions to a UE over a downlink DL MIMO channel. The method includes determining that the UE is configured to support N DL MIMO layers and transmit reference signals over L antenna chains. In response to determining that L<N, the method includes generating channel information for the DL MIMO channel using (i) L uplink reference signals, each transmitted by the UE over a respective one of the L Rx chains, and (ii) one or more additional transmissions received from the UE. The method further includes transmitting data streams over the DL MIMO channel in accordance with the generated channel information.

Another embodiment of these techniques is a base station that includes processing hardware configured to implement the method above.

DETAILED DESCRIPTION OF THE DRAWINGS

Figure 1A:
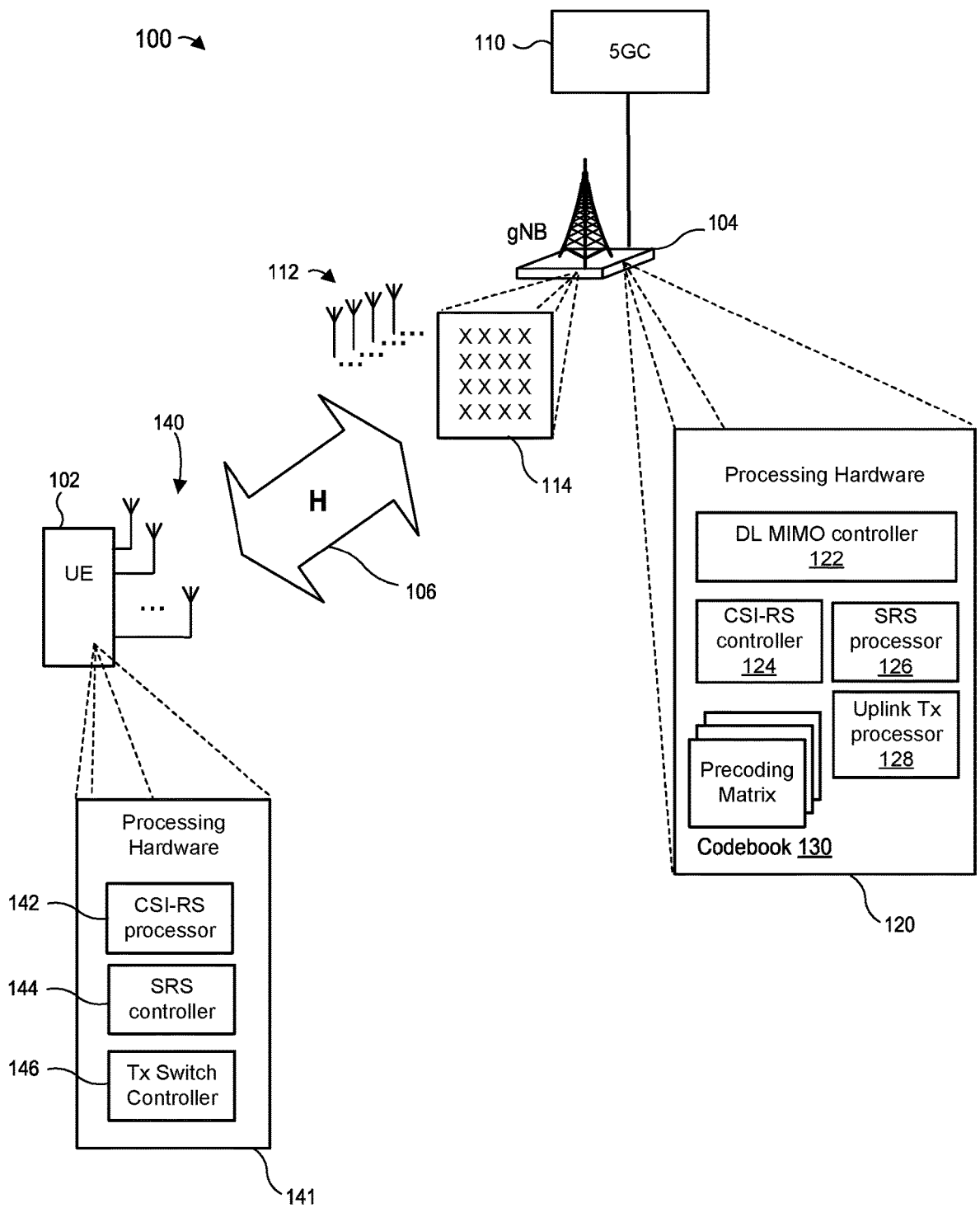
FIG. 1A is a block diagram of an example communication system in which a base station can transmit one or more data streams to a UE over downlink (DL) multiple-input, multiple-output (MIMO) channel.

FIG. 1A depicts an example wireless communication network 100 in which a UE 102 capable of antenna switching can receive multiple data streams from a base station 104 over a DL MIMO channel 106. To improve channel estimation for coherent demodulation and mitigate interference for the DL MIMO channel 106, the base station 104 generates channel information using reference signals and, in some cases, transmissions other than reference signals. As discussed below, the base station 104 can use signals transmitted in the downlink (from the base station 104 to the UE 102) and/or uplink (from the UE 102 to the base station 104) directions.

The base station 104 in this example implementation operates as a 5G Node B (gNB) that supports 5G NR. The base station 104 directly or indirectly connects to a 5G core network (5GC) 110 to access various core network functions, services, components, etc. In another implementation, the base station 104 operates as a next-generation evolved Node B eNB (ng-eNB) and supports an Evolved Universal Terrestrial Radio Access (EUTRA) radio interface and connects to the 5GC 100. In yet another implementation, the base station 104 operates as an eNB and connects to an Evolved Packet Core (ECP) rather than the 5GC. More generally, the base station 104 can support any suitable RAT and connect to any suitable core network.

The base station 104 is equipped with multiple antennas 112 accessible via respective antenna Tx ports 114. In an example implementation, the base station 104 can transmit CSI-RSs and/or DM-RSs over 32 antenna ports, in a beamformed or non-beamformed manner. The base station 104 also includes processing hardware 120 that can include one or more general-purpose processors such as central processing units (CPUs) and non-transitory computer-readable memory storing machine-readable instructions executable on the one or more general-purpose processors, and/or special-purpose processing units. The processing hardware 120 can include a DL MIMO controller 122 coupled to a CSI-RS controller 124, an SRS processor 126, and an uplink TX processor 128. The base station 104 also can store a codebook 130 that includes precoding matrices.

In operation, the DL MIMO controller 122 performs channel estimation for the DL MIMO channel 106 to identify suitable DL MIMO precoding information, such as the transmission layer and the precoding matrix, to cancel correlation between the antennas 112. For simplicity, the disclosure refers to the information which the DL MIMO controller 122 generates and applies to downlink data streams for coherent demodulation and mitigation of interference as "channel information."

The DL MIMO controller 122 in some cases can generate the channel information using only CSI, which the CSI-RS controller 124 can receive from the UE 102. More particularly, the CSI-RS controller 124 can configure the UE 102 to receive one or more CSI-RSs (or, in some implementations, DM-RSs) according to a certain CSI-RS resource set selection, transmit CSI-RSs to the UE 102 in accordance with the configuration, and receive CSI information from the UE 102. The UE 102 can include in the CSI a Rank Indicator (RI) to specify the suggested number of transmission layers to the base station 104, a precoding matrix indicator (PMI) to suggest a suitable MIMO precoding matrix for the specified RI, and a Channel Quality Indicator (CQI) to specify the modulation and channel coding scheme (MCS) suitable for the specified PMI. Further, when the CSI-RS controller 124 generates beamformed CSI-RS transmissions, the CSI information from the UE can include a CSI-RS Resource Indicator (CRI) to identify a beam. Thus, when the CSI-RS controller 124 transmits multiple beams, the UE 102 can scan the CSI-RS transmission, assess signal quality for each beam, generate a respective CSI for each beam, and report the CSI information for each beam using the CRI as a beam identifier.

The UE 102 can include RI, PMI, and the CQI in the CSI when the base station 104 is a gNB or an eNB. However, when the base station is a gNB, the UE 102 additionally can include in the CSI a Layer Indicator (LI) to notify the base station 104 which DL MIMO layer the UE 102 has identified as the best one, as well as a Synchronization Signal Block (SSB) Physical Broadcast Channel (PBCH) Block Resource Indicator (SSBRI) and layer 1 reference signal received power (L1-RSRP), which the base station 104 can use in beam management and mobility procedures.

Thus, the CSI-RS controller 124 in some scenarios configures the UE 102 to process CSI-RS transmissions, the base station 104 transmits the CSI-RSs over the corresponding antennas or groups of antennas 112, the UE 102 transmits CSI information to the base station 104, and the DL MIMO controller 122 generates channel information using the received CSI. The DL MIMO controller 122 then uses the generated channel information when transmitting data streams to the UE 102, e.g., by applying respective phase and gain weights to the antennas 112, via the corresponding Tx chains.

The DL MIMO controller 122 in other scenarios generates channel information using the results of processing SRS transmissions from the UE 102 and, in some cases, one or more other transmissions from the UE 102. Generally speaking, the SRS processor 126 can estimate the state of the uplink counterpart of the DL MIMO channel 106 using SRS transmissions. When the downlink and uplink transmissions share the same frequency or frequencies using time division multiplexing such as Time Division Duplex (TDD), the SRS processor 126 can exploit channel reciprocity and estimate channel information for the DL MIMO channel 106 based on the estimated state of the corresponding UL MIMO channel. The SRS processor 126 can select SRSs from one or more SRS resource sets, depending on whether the UE 102 will transmit the SRSs at different times or concurrently, and instruct the UE 102 to generate SRS transmissions in accordance with these selections.

When the antenna switching capability of the UE 102 allows the UE 102 to receive over N Rx antenna chains (or simply "Rx chains") but transmit uplink reference signals over only L of these Rx chains, L<N, the L SRS transmissions from the UE 102 are not sufficient for the base station 104 to accurately estimate the DL MIMO channel 106 with N DL MIMO layers. As discussed in more detail below, the DL MIMO controller 122 can use the L SRS transmissions along with (i) some or all of the CSI, which the CSI-RS controller 124 can generate as discussed above, (ii) additional one or more SRSs, which the UE 102 can transmit over some of the same L Rx chains during a different time period (e.g., a time slot), or (iii) one or more transmissions over a physical uplink channel, or several such channels. The one or more transmissions over a physical uplink channel can include for example a medium access control (MAC) protocol data unit (PDU), a scheduling request, a hybrid automatic repeat request (HARQ) positive acknowledgement, or a HARQ negative acknowledgement, etc. The uplink TX processor 128 can process these transmissions and provide the corresponding measurements to the DL MIMO controller 122.

In some cases, the base station 104 uses code-book based precoding to transmit data streams to the UE 102 over the DL MIMO channel 106. The DL MIMO controller 122 can use the determined channel information to select a precoding matrix from among multiple precoding matrices stored in the memory of the base station 104 as a part of a codebook 130. In other cases, the base station 104 generates a precoding matrix without using the codebook 130. These two approaches are further discussed with reference to FIGS. 3A and 3B.

With continued reference to FIG. 1A, the UE 102 is equipped with multiple antennas 140. Using the antennas 140, the UE 102 can receive downlink data streams from the base station 1034 via Rx ports and transmit uplink data streams to the base station 104 via Tx ports (as discussed below with reference to FIGS. 2A-B, the number of Tx ports may be smaller than the number of Rx ports). The UE 102 also is equipped with processing hardware 141 that can include one or more general-purpose processors such as central processing units (CPUs) and non-transitory computer-readable memory storing machine-readable instructions executable on the one or more general-purpose processors, and/or special-purpose processing units. The processing hardware 141 includes a CSI-RS processor 142, an SRS controller 144, and Tx switch controller 146 to switch some or all of the antennas 140 between Tx and Rx modes of operation, as discussed with reference to FIGS. 2A-D.

In operation, the CSI-RS processor 142 receives CSI-RS transmissions from the base station 104 in accordance with the configuration CSI-RS controller 124 has provided, determines the one or more CSIs as discussed above, and provides the CSI information to the base station 104. The CSI-RS processor 142 in some cases also processes DM-RSs. The SRS controller 144 generates SRS transmissions according to the configuration the SRS processor 126 has provided.

Figure 1B:
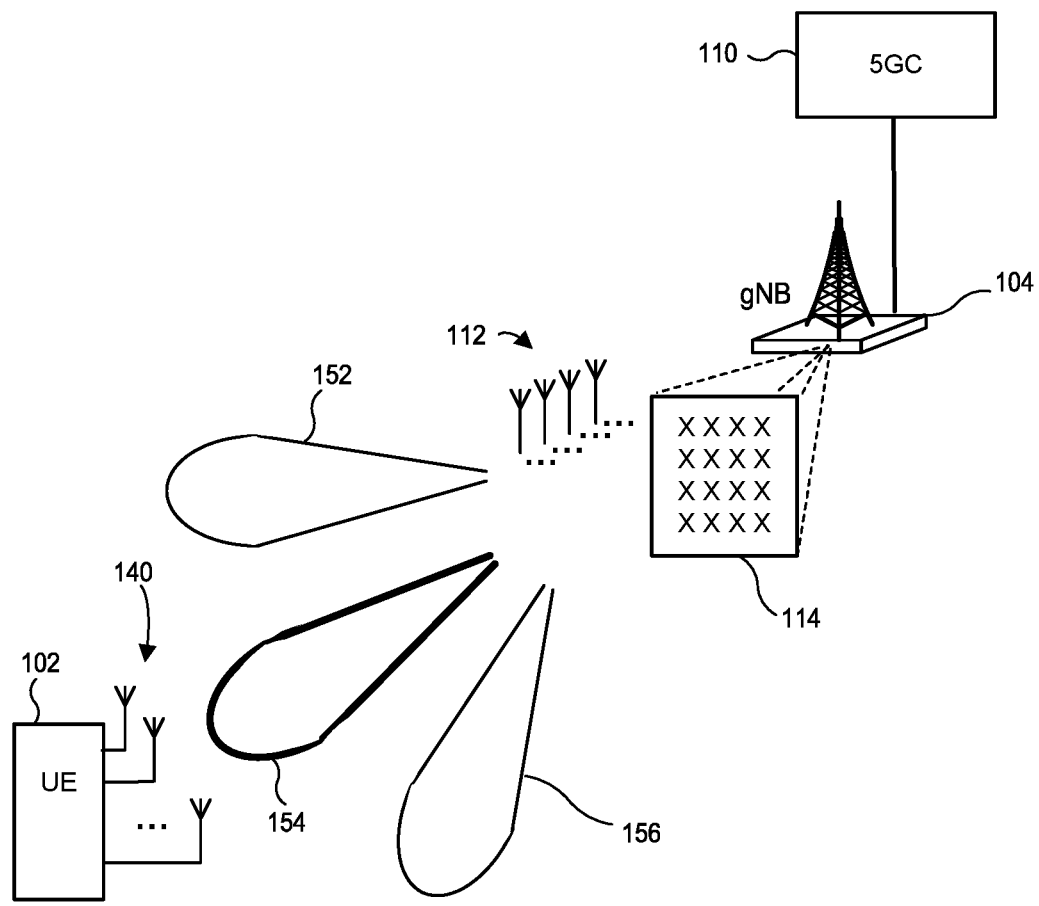
FIG. 1B illustrates beamformed downlink reference signals which the base station of FIG. 1 can transmit to estimate the DL MIMO channel.

FIG. 1B illustrates the wireless communication network 100 when the base station 104 transmits beamformed CSI-RSs, or other suitable downlink reference signals, for the UE 102 to estimate the DL MIMO channel 106. The base station 104 in this scenario transmits one or more CSI-RSs to form a beam 152 with a first orientation, one or more CSI-RSs to form a beam 154 with a second orientation, and one or more CSI-RSs to form a beam 156 with a third orientation. The base station 104 in general can generate any suitable number of beams. As a more specific example, the beam 152 can correspond to CSI-RSs transmitted over the first eight Tx ports 114, the beam 154 can correspond to CSI-RSs transmitted over the next eight Tx ports 114, etc. The CSI-RS processor 142 can determine a respective CSI for each of the beams 152, 154, and 156, and provide the determines CSI to the base station 104. Using this feedback, the base station 104 can determine that the beam 154 is most closely oriented toward the UE 102, and accordingly transmit data streams to the UE 102 over a beam oriented similar to the beam 154.

More generally, using channel information, the base station 104 can perform beamforming or spatial multiplexing for a DL MIMO operation that involves one, two, or more DL MIMO layers.

Next, FIGS. 2A-D illustrate several examples configurations of the antennas 140 in the UE 102. In each of these implementations, the UE 102 has fewer Tx ports than Rx ports. Further, the UE 102 in each of these configurations has four Rx paths, at least one of which the UE 102 can switch to the Tx mode for the purposes of transmitting an SRS. However, because the ability of the UE 102 to switch the Rx paths is different in the configurations of FIGS. 2A-D, each of these configurations requires that the UE 102 report its switch capability to the base station 104 differently, and generate SRS transmissions in accordance with reported capability and the configuration received from the base station 104.

Figure 2A:
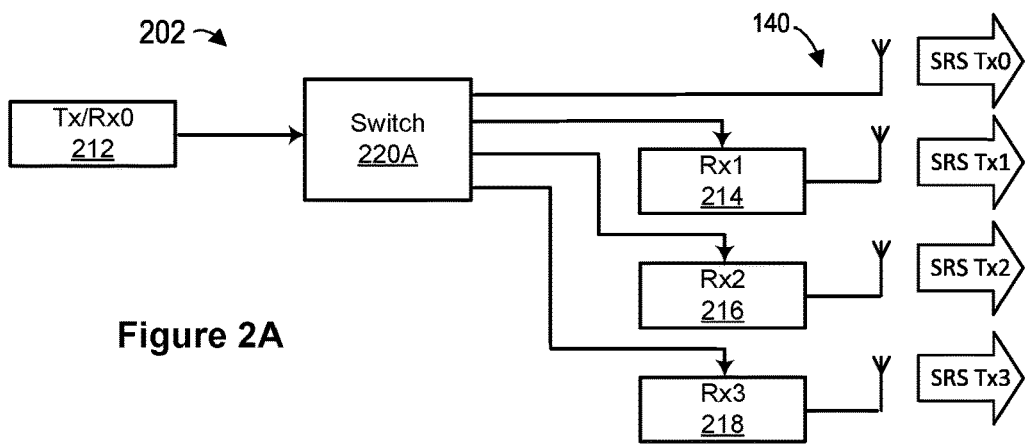
FIG. 2A illustrates an example antenna configuration for receiving over four receive (Rx) chains and transmitting reference signals over four transmit of these chains, which can be implemented in the UE of FIG. 1.

According to a configuration 202 of FIG. 2A, the UE 102 has four Rx paths 212, 214, 216, and 218. The UE 102 accordingly can receive four data streams over the DL MIMO channel 106. In other words, the UE 102 supports four N=4 DL MIMO layers. The Rx path 212 also operates as the primary SRS-transmission Rx chain or path, and thus can be referred to as the Rx/Tx path 212. A one-to-four switch 220A allows the Tx switch controller 146 to transmit SRS over L=4 Rx paths 212, 214, 216, and 218, during certain periods of time. The Rx paths 214, 216, and 218 thus can operate as diversity SRS-transmission Rx paths or chains, and can be referred to as SRS-transmission Rx chains or paths. For example, the Tx switch controller 146 can cause the UE 102 to transmit SRS over the Rx/Tx path 212 in a certain OFDM symbol $S_1$, then operate the switch 220A to cause the UE 102 to transmit SRS over the Rx path 214 during the next (second) OFDM symbol $S_2$, then operate the switch 220A again to cause the UE 102 to transmit SRS over the Rx path 216 during another (third) OFDM symbol $S_3$, and yet again operate the switch 220A to cause the UE 102 to transmit SRS over the Rx path 218 during the fourth OFDM symbol $S_4$. More generally, the Tx switch controller 146 can select any suitable periods of time for SRS transmission. In other implementations, the UE 102 can concurrently transmit SRS over two or more of the Rx chains 212, 214, 216, and 218.

Figure 2B:
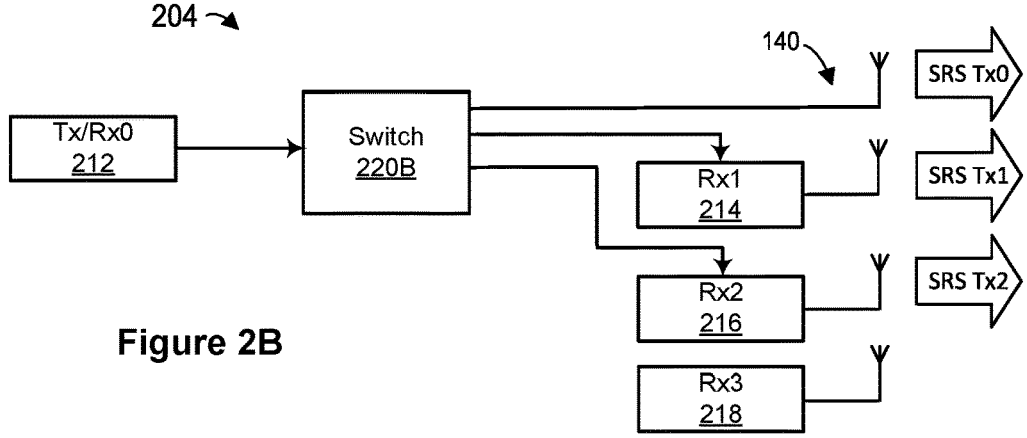
FIG. 2B illustrates an example antenna configuration for receiving over four Rx chains and transmitting reference signals over three of these chains, which can be implemented in the UE of FIG. 1.

In a configuration 204 of FIG. 2B, the UE 102 also has four Rx path 212, 214, 216, and 218, and accordingly can receive four data streams over the DL MIMO channel 106. A one-to-three switch 220B allows the Tx switch controller 146 to transmit SRS over L=3 Rx paths 212, 214, and 216. However, the UE 102 cannot transmit SRS over the Rx path 218, which can be referred to as a non-SRS-transmission Rx path or chain. Using the Tx switch controller 146, the UE 102 can transmit SRSs over the paths 212, 214, or 216 during different time periods (e.g., OFDM symbols) or during the same time period.

Figure 2C:
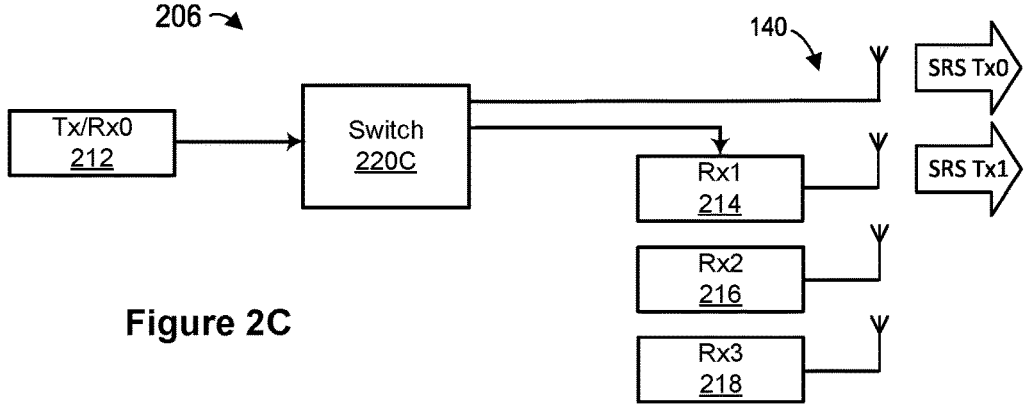
FIG. 2C illustrates an example antenna configuration according for receiving over four Rx chains and transmitting reference signals over two of these chains, which can be implemented in the UE of FIG. 1.

Further, in a configuration 206 of FIG. 2C, the UE 102 also has four Rx path 212, 214, 216, and 218, and accordingly can receive four data streams over the DL MIMO channel 106. A one-to-two switch 220C allows the Tx switch controller 146 to transmit SRS over L=2 Rx paths 212 and 214, but not over the Rx paths 216 or 218. Similar to the configurations 202 and 205, the UE 102 can use the Tx switch controller 146 to transmit SRSs over the paths 212 and 214 during different time periods or during the same time period.

Figure 2D:
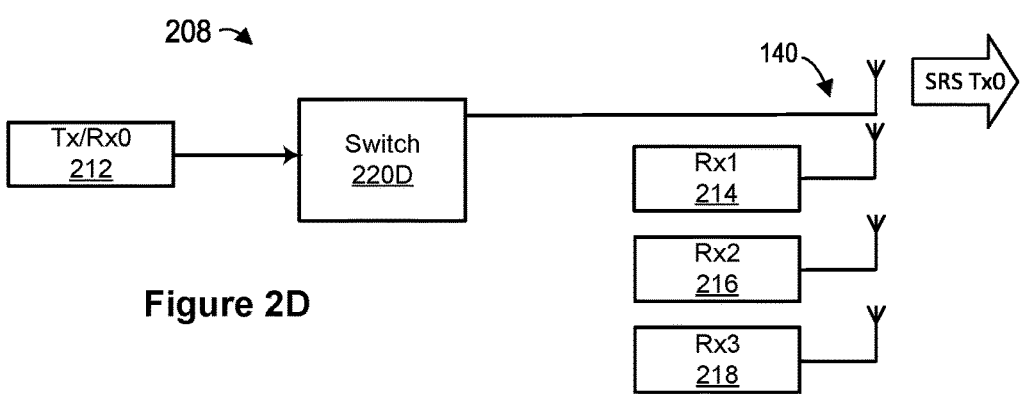
FIG. 2D illustrates an example antenna configuration for receiving over four Rx chains and transmitting reference signals over one of these chains, which can be implemented in the UE of FIG. 1.

Still further, a configuration 208 of FIG. 2D also includes four Rx path 212, 214, 216, and 218, but a switch 220D allows the Tx switch controller 146 to transmit SRS over only Rx/Tx path 212, i.e., L=1. The UE 102 in this configuration cannot transmit SRS over the Rx paths 214, 216, or 218.

For the configuration 202, the UE 102 can report its Tx/Rx capability to the base station 104 as "one Tx chain, four Rx chains" (1T4R). For the configuration 204, the UE 102 can report its Tx/Rx capability to the base station 104 as "one Tx chain, three Rx chains" (1T3R). For the configuration 206, the UE 102 can report its Tx/Rx capability to the base station 104 as "one Tx chain, two Rx chains" (1T2R). For the configuration 208, UE 102 can report its Tx/Rx capability to the base station 104 as "one Tx chain, one Rx chain" (1T1R). To this end, the UE 102 communicating with the base station 104 over 5G NR can use an information element (IE) supportedSRS-TxPortSwitch described in 3GPP TS 38.331. The UE 102 can include this IE in a BandParameters IE, and in turn include the BandParameters IE in a BandCombinationList IE. Further, the UE 102 can use a FeatureSetCombination IE to report that the UE 102 supports N=4 DL MIMO layers. More specifically, the UE 102 can utilize a FeatureSet IE included in the FeatureSetCombination IE, in which the UE 102 can select a FeatureSetDownlinkID value to indicate a certain supported feature set, on a per-band basis. The UE 102 can link the value of FeatureSetDownlinkID to a certain FeatureSetDownlinkPerCC, in which the MIMO-LayersDL field indicates how many DL MIMO layers the UE 102 supports.

When the UE 102 communicates with the base station 104 over EUTRA, the UE 102 can report its antenna switching capability to the base station 104 using a BandParameters IE included in a UE-EUTRA-Capability UE, in accordance with TS 36.331. The BandParameters IE in turn can include IEs such as SRS-1T4R, SRS-2T4R-2Pairs, or SRS-2T4R-3Pairs. For example, to report "two Tx chains, four Rx chains, with two pairs" or 2T4R-2Pairs capability according to a certain antenna configuration (now shown), the UE 102 can include for example a Tx0←→{Rx0, Rx1} parameter as one pair to indicate that the UE 102 can switch SRS transmission between the Rx0 and Rx1 chains, as well as a Tx1←→{Rx2, Rx3} parameter as the other pair to indicate that the UE 102 also can switch SRS transmission between Rx2 and Rx3. In another example, to report "two Tx chains, four Rx chains, with three pairs" or 2T4R-3Pairs capability according to a certain antenna configuration (not shown), the UE 102 can include for example a Tx0←—→{Rx0} parameter to indicate that the UE 102 can switch SRS transmission only for Rx0 chain, as well as a Tx1←—→{Rx1, Rx2,Rx3} as three pairs parameter to indicate that the UE 102 also can switch SRS transmission among Rx1-Rx3. To report the number of supported DL MIMO layers over EUTRA, the UE 102 can use a supportedMIMO-CapabilityDL IE included in a CA-MIMO-ParameterDL, or use a FeatureSetDL-PerCC IE included in a FeatureSet IE.

Prior to discussing several example techniques the base station 104 can implement to efficiently control transmissions over the DL MIMO channel 106 based on the DL MIMO layer capability and the switching capability the UE 102 reports, example DL MIMO operation using precoding matrices is briefly considered next, for additional clarity.

Figure 3A:
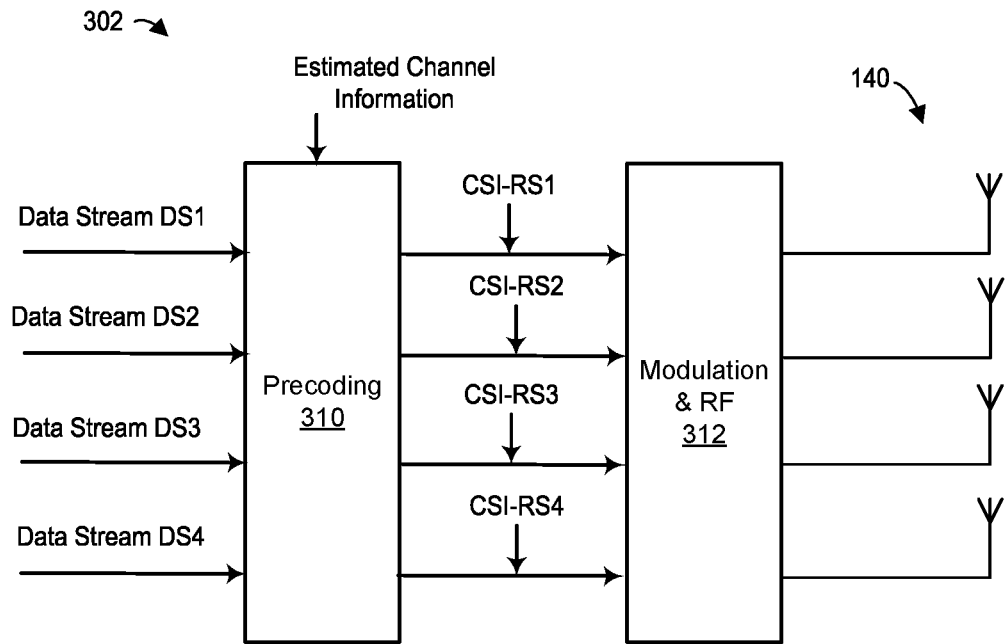
FIG. 3A is a block diagram of an example DL MIMO operation using codebook-based precoding, which can be implemented in the UE of FIG. 1.

Referring first to FIG. 3A, an example four-layer DL MIMO operation mode 302 uses codebook-based precoding. The DL MIMO controller 122 obtains channel information based on one or more of downlink reference signals, uplink reference signals, uplink non-reference signals, etc., and selects a suitable precoding matrix from the codebook 130. The base station 104 then indicates to the UE 102 which precoding matrix the base station 104 has selected from the codebook. To this end, the base station 104 can transmit a downlink control information (DCI) on at least one Physical Downlink Control Channel (PDCCH). The base station 104 applies the selected precoding matrix to data streams $DS_1$, $DS_2$, $DS_3$, and $DS_4$ in a precoding operation 310. The base station 104 can multiplex the pre-coded data streams $DS_1$-$DS_4$ with or without the downlink reference signals (e.g., CSI-RSs or Cell Specific Reference Signals (CRSs)), performs a modulation and RF upconversion operation 312. The base station 104 then transmits the data streams on a Physical Downlink Shared Channel (PDSCH) with or without multiplexing of the downlink reference signals.

Figure 3B:
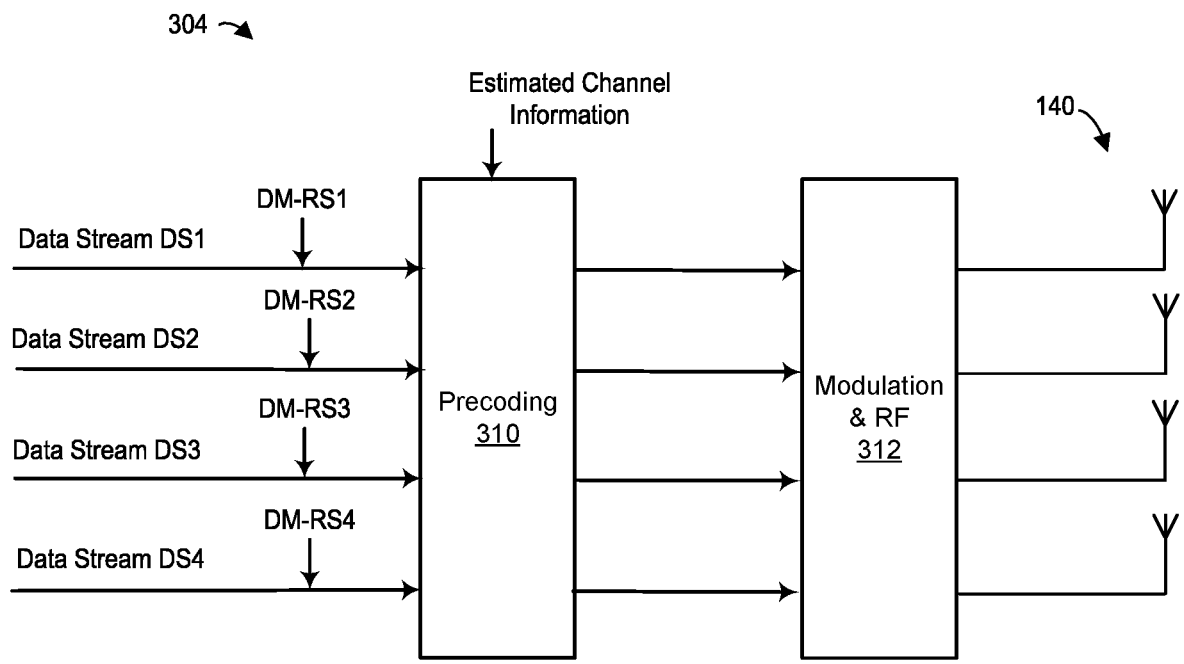
FIG. 3B is a block diagram of an example DL MIMO operation using non-codebook-based precoding, which can be implemented in the UE of FIG. 1.

On the other hand, in an example DL MIMO operation mode 304 of FIG. 3B, the base station 104 does not use codebook-based precoding. Similar to the operation mode 302, the DL MIMO controller 122 obtains channel information based on one or more of downlink reference signals, uplink reference signals, uplink non-reference signals, etc., but rather than selecting a precoding matrix from the codebook 130, the DL MIMO controller 122 determines a precoding matrix based on the estimated channel information. The precoding matrix can correspond to one of the precoding matrices in the codebook 130, or not correspond to any of these matrices, depending on the scenario. Prior to performing the precoding operation 310, the base station 104 adds a respective DM-RS to each data stream. The base station 104 then performs a modulation and RF upconversion operation 312 and transmits the data streams or on a PDSCH with or without multiplexing of the CSI-RSs. The base station 104 also can transmit a DCI on a PDCCH to notify the UE 102 of at least one PDSCH transmission. Unlike the operation mode 302 discussion above, according to the operation mode 304 the base station 104 does not include an indication of a precoding matrix in the DCI.

In any case, DL MIMO transmissions from the base station 104 to the UE 102 can be modeled as $$Y = HX + N \quad \text{(Eq. 1)},$$

where X is the signal the base station 104 transmits, Y is the signal the UE 102 receives, H is channel information, and N is the Additive Gaussian White Noise (AGWN). For example, when the base station 104 configures the UE 102 for a four-layer DL MIMO transmission, the general model of Eq. 1 becomes:

$$\begin{bmatrix} y_1 \\ y_2 \\ y_3 \\ y_4 \end{bmatrix} = \begin{bmatrix} h_{1,1} & h_{1,2} & h_{1,3} & h_{1,4} \\ h_{2,1} & h_{2,2} & h_{2,3} & h_{2,4} \\ h_{3,1} & h_{3,2} & h_{3,3} & h_{3,4} \\ h_{4,1} & h_{4,2} & h_{4,3} & h_{4,4} \end{bmatrix} \begin{bmatrix} x_1 \\ x_2 \\ x_3 \\ x_4 \end{bmatrix} + \begin{bmatrix} n_1 \\ n_2 \\ n_3 \\ n_4 \end{bmatrix} \quad \text{(Eq. 2)}$$

In the downlink direction, the CSI-RS processor 142 of the UE 102 can use the Least Square (LS) or the Minimum Mean Square Error (MMSE) technique, for example, to acquire the channel information H based on CSI-RSs or DM-RSs. The CSI-RS processor 142 then can decompose the estimated channel information H into a product of three matrices, $UDV^T$, using Singular Value Decomposition (SVD), for example. The rank of matrix D corresponds to the rank of the channel information matrix H and the number of DL MIMO layers. The CSI-RS processor 142 can derive an estimated precoding matrix from V. In some implementations, the UE 102 stores a codebook similar to the codebook 130 of the base station 104 and can compare each of the matrices in the codebook to V, so as to identify the closest one as the PMI and report the PMI to the base station 104.

In the uplink direction, the DL MIMO controller 120 also can use the LS or the MMSE technique to acquire the channel information H using SRSs and, as discussed in more detail below, one or more other transmissions from the UE 102. Similar to the approach discussed above, the DL MIMO controller 120 can apply SVD to decompose H into a product $UDV^T$ and derive an estimated precoding matrix from V. Depending on whether the base station 104 uses codebook-based or non-codebook-based precoding, the base station 104 can notify the UE 102 of the precoding matrix or omit the notification.

To determine the distance between two matrices, the UE 102 or the base station 104 can calculate a matrix norm or matrix similarity, for example. More specifically, for a pair of matrices $$A = \begin{bmatrix} a_1 \\ a_2 \\ a_3 \\ a_4 \end{bmatrix} \text{ and } B = \begin{bmatrix} b_1 \\ b_2 \\ b_3 \\ b_4 \end{bmatrix},$$

the distance between A and B in matrix norm is the norm of (A−B), and in matrix similarity the distance between A and B is $a_1 b_1 + a_2 b_2 + a_3 b_3 + a_4 b_4$.

Next, several example techniques for controlling transmissions over the DL MIMO channel 106 are discussed with reference to FIGS. 4A-9. In some cases, a base station can implement more than one of the techniques of FIGS. 4A-9 to better adjust to different conditions of DL MIMO channels, for example.

Although the discussion of FIGS. 4A-7D refers specifically to CSI-RS and SRS transmissions, in general a base station can determine channel information for a DL MIMO channel using any suitable uplink reference signals and/or downlink reference signals. Further, the base station involved in the scenarios below in general can support any suitable RAT and be coupled to a core network of any suitable type, but for convenience the examples of FIGS. 4A-7D refer specifically to the gNB 104. Still further, although the base station in the examples below uses the determined channel information primarily for transmitting multiple streams over respective DL MIMO layers, the base station also can use the estimated channel information for beamforming or spatial multiplexing. For example, the base station can select the best beam for transmitting data on a PDSCH to the UE.

Figure 4A:
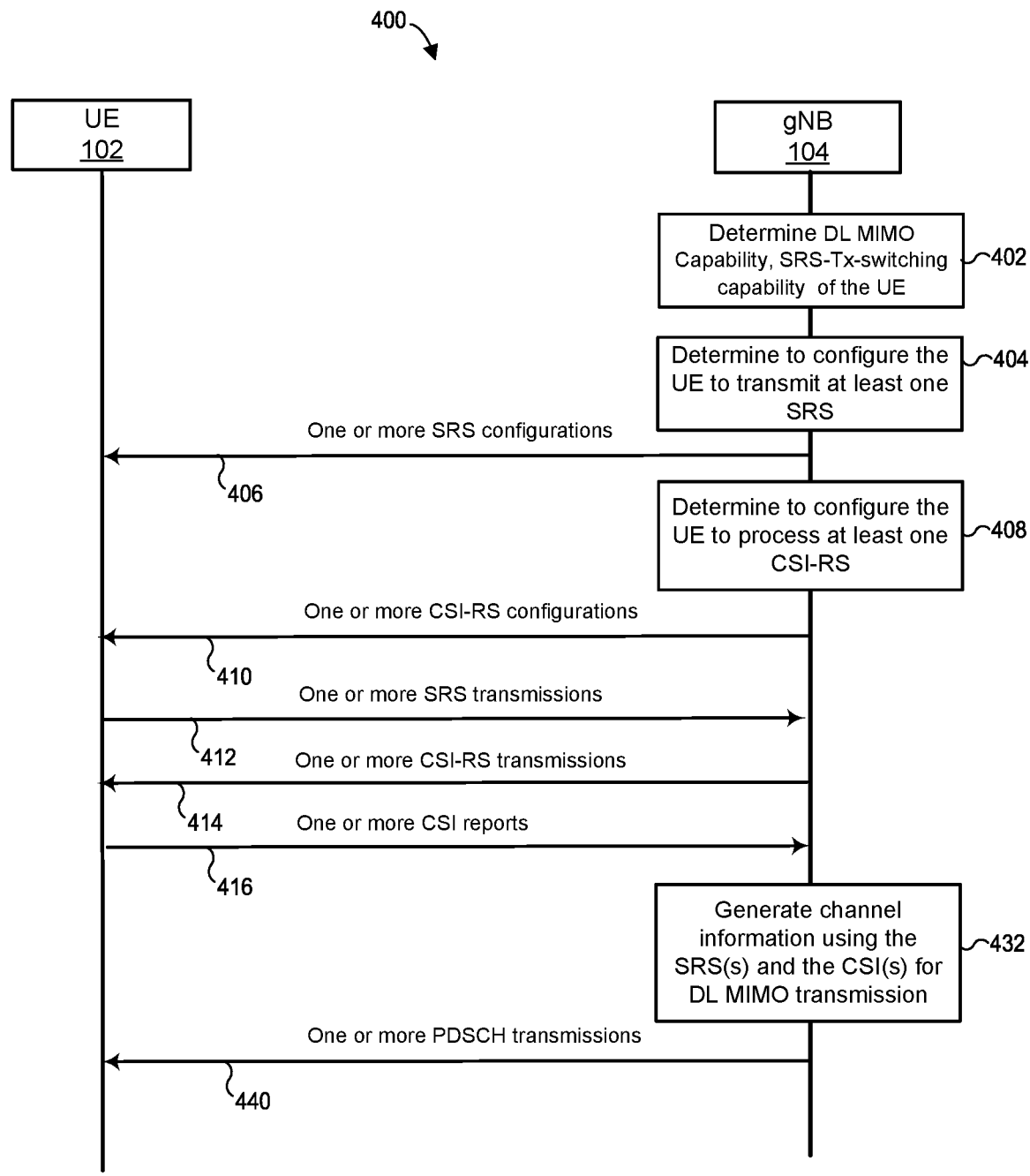
FIG. 4A is a messaging diagram of an example scenario in which a base station determines channel information for a DL MIMO channel using uplink reference signals and downlink reference signals, which can be implemented in the system of FIG. 1.

Referring first to FIG. 4A, the gNB 104 in a scenario 400 first determines 402 how many DL MIMO layers the UE 102 supports (N), and how many of its Rx paths the UE 102 can switch to SRS transmission (L). For convenience, the number of supported DL MIMO layers can be referred to as DL MIMO capability, and the ability to switch Rx paths for the purposes of SRS transmissions can be referred to as the SRS-Tx-switching capability. In this scenario, N<L (e.g., N=4 and L=2, as illustrated in FIG. 2C). The value N can be less than or equal a certain predefined maximum $N_{max}$ of DL MIMO layers. $N_{max}$ in an example implementation is four.

In one implementation, the gNB 104 receives the DL MIMO capability and the SRS-Tx-switching capability from the UE 102. The gNB 104 for example can receive a Radio Resource Control (RRC) message including an IE that specifies capabilities of the UE 102. More particularly, the gNB 104 can receive an NR RRC UE Capability Information message including a UE-NR-Capability IE. When the base station 104 is implemented as an eNB or an ng-eNB, the RRC message can be EUTRA RRC UE Capability Information message including a UE-EUTRA-Capability IE.

In another implementation, the gNB 104 receives the DL MIMO capability and the SRS-Tx-switching capability from another base station. In yet another implementation, the gNB 104 receives the DL MIMO capability and the SRS-Tx-switching capability from a Mobility Management Entity (MME), an Access and Management Function (AMF), or another suitable component of a core network such as the 5GC 110.

Based on the determined DL MIMO capability and the SRS-Tx-switching capability of the UE 102, the gNB 104 determines 404 that the UE 102 should transmit at least one SRS. For example, when N=4 and L=2, the gNB can determine to configure the UE 102 to transmit two SRSs corresponding to two of the four supported DL MIMO layers. The gNB 104 then selects two SRSs from one or more SRS resource sets and transmits 406 the one or more SRS configurations to the UE 102.

Because L<N, the gNB 104 determines that L SRS transmissions will be insufficient to obtain channel information for all N DL MIMO layers. The gNB 104 accordingly determines 408 to configure the UE 102 to process one or more CSI-RS transmissions. The gNB 104 then provides 410 the CSI-RS configuration to the UE 102. In the example above, where N=4 and L=2 as illustrated in FIG. 2C, the gNB 104 can configure the UE 102 to process two CSI-RSs.

According to the scenario 400, the UE 102 transmits 412 the one or more SRSs to the gNB 104, and the gNB 104 transmits 414 one or more CSR-RSs. The events 412 and 414 can occur in either order. The UE 102 measures the one or more CSI-RSs to generate one or more CSIs and transmits 416 the one or more CSI reports to the gNB 104 on at least one physical uplink control channel (PUCCH) or a physical uplink shared channel (PUSCH), via one or more Tx chains.

The gNB 104 then generates 432 channel information using both the received one or more SRSs and the one or more received CSIs. The gNB 104 also can determine what number of DL MIMO layers, or rank, the gNB 104 should configure the UE 102 to use. Further, the gNB 104 can determine a precoding matrix and an MCS. The gNB 104 then can transmit 440 data streams over the DL MIMO channel to the UE 102 in accordance with the determined channel information, over one or more PDSCHs. The gNB 104 can use codebook-based precoding or non-codebook-based precoding as discussed above with reference to FIGS. 3A and 3B, respectively.

To continue with the example above, when N=4 and L=2, the gNB 104 can configure the UE 102 to receive four CSI-RSs and transmit two SRSs. The gNB 104 then transmits CSI-RSs over four different antenna Tx ports 114. The UE 102 transmits SRSs over the Rx chains 212 and 214 (see FIG. 2C for example). The UE 102 processes the four CSI-RS transmissions to estimate channel information, selects a four-by-four precoding matrix V_PMI, and reports 416 the corresponding PMI to the gNB 104.

Because the gNB 104 receives only two SRSs in this scenario, the gNB 104 cannot generate a four-by-four precoding matrix using the SRSs. However, the gNB 104 uses the two SRSs along with the PMI to improve the selection of a suitable precoding matrix. In particular, the channel H can be modelled as $$H = [H_1 \ H_2 \ H_3 \ H_4] \quad (Eq. 3)$$

where $$H_1 = \begin{bmatrix} h_{1,1} \\ h_{2,1} \\ h_{3,1} \\ h_{4,1} \end{bmatrix}, H_2 = \begin{bmatrix} h_{1,2} \\ h_{2,2} \\ h_{3,3} \\ h_{4,4} \end{bmatrix}, H_3 = \begin{bmatrix} h_{1,3} \\ h_{2,3} \\ h_{3,4} \\ h_{4,4} \end{bmatrix},$$

and $$H_4 = \begin{bmatrix} h_{1,4} \\ h_{2,4} \\ h_{3,4} \\ h_{4,4} \end{bmatrix}$$

The gNB 104 can obtain the (eight) values of only $H_1$ and $H_2$ using the two SRS transmissions. To acquire full channel information, the gNB 104 can use any predefined value with finite level for each unknown element of the matrix H, i.e., elements $h_{1,3}, h_{2,3}, \ldots h_{4,4}$ of the matrices $H_3$ and $H_4$. More specifically, the gNB 104 can use four-level predefined values such as 1+j, 1−j, −1+j, or −1−j, for example.

The gNB 104 can compute $4^8$ precoding four-by-four matrices V' for the full channel configuration. These $4^8$ matrices span vector space S, and the gNB 104 can project the matrix V_PMI onto this vector space. If V_PMI is already in the vector space S, the gNB 104 can use V_PMI as the estimated precoding matrix V. Otherwise, if V_PMI is not in the vector space S, the gNB 104 can compare a projection of V_PMI onto the vector space S, V_project, to each of the $4^8$ matrices V' and chooses the closest-distance matrix relative to V_project from among these matrices as the estimated precoding matrix V.

In another example scenario, the gNB 104 configures the UE 102 to process two CSI-RSs and transmit two SRSs. The gNB 104 transmits the two CSI-RSs over two respective antenna ports 114. The UE 102 transmits the two SRSs over the chains 212 and 214. The V_PMI in this case is a two-by-two matrix V_PMI=[$V_1$ $V_2$], where $V_1$=[$v_{1,1}$ $v_{1,2}$] and [$v_{2,1}$ $v_{2,2}$]. The gNB 104 can generate $4^8$ four-by-four matrices V' using the SRS transmissions as discussed above and choose the shortest distance between V_PMI and the elements ($v'_{1,1}$, $v'_{1,2}$, $v'_{2,1}$, $v'_{2,2}$,) of V' to determine the estimated precoding matrix V.

According to one specific example, the DL MIMO capability of the UE 102 is four, and the gNB 104 configures the UE 102 with three CSI-RSs and one SRS. The UE 102 transmits CSIs corresponding to the three CSI-RSs and the SRS. The gNB 104 can compute at most three ranks using the CSIs and at most one rank using the SRS. If the gNB 104 acquires three ranks from the CSIs and one rank from the SRS, the gNB 104 can generate channel information using these four ranks and implement a four-layer DL MIMO operation on at least one PDSCH, to transmit data streams to the UE 102.

According to another specific example, the DL MIMO capability of the UE 102 is four, and the gNB 104 configures the UE 102 with two CSI-RSs and two SRSs. The UE 102 transmits CSIs corresponding to the two CSI-RSs and the two SRSs. The gNB 104 can compute at most two ranks using the CSIs and at most two ranks using the SRSs. The gNB 104 can generate channel information using these four ranks and implement a four-layer DL MIMO operation on at least one PDSCH, to transmit data streams to the UE 102.

According to yet another specific example, the DL MIMO capability of the UE 102 is four, and the gNB 104 configures the UE 102 with one CSI-RSs and three SRSs. The UE 102 transmits a CSI corresponding to the CSI-RS and the three SRSs. The gNB 104 can compute at most one using the CSI and at most three ranks using the SRSs. Similar to the examples above, the gNB 104 can generate channel information using these four ranks and implement a four-layer DL MIMO operation on at least one PDSCH, to transmit data streams to the UE 102.

Figure 4B:
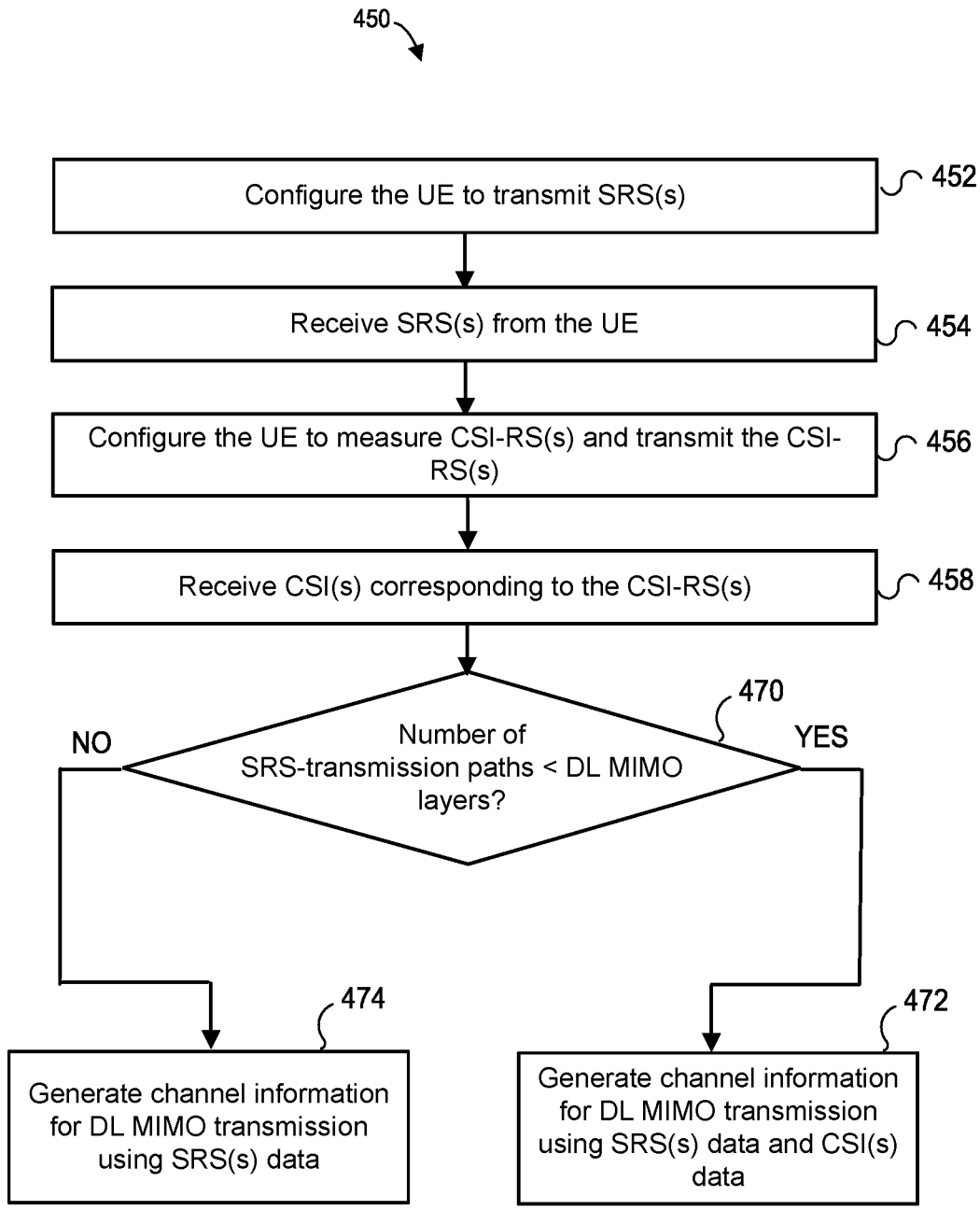
FIG. 4B is a flow diagram of an example method for determining channel information for a DL MIMO channel using uplink reference signals alone or uplink reference signals along with downlink reference signals, which can be implemented in the base station of FIG. 1.

FIG. 4B illustrates an example method 450 for determining channel information for a DL MIMO channel using uplink reference signals alone or in combination with downlink reference signals. The method 450 can be implemented in the gNB 104 (as a more specific example, in the DL MIMO controller 122). The method 450 begins at block 452, where the gNB 104 configures the UE 102 to transmit one or more SRS. In particular, the gNB 104 can configure the UE 102 to transmit as many SRSs as there are SRS-transmission Rx paths at the UE 102.

Next, at block 454, the gNB 104 receives one or more SRS transmission from the UE 102. At block 456, the gNB 104 configures the UE 102 to measure one or more CSI-RS transmissions. After the gNB 104 transmits on the one or more CSI-RSs to the UE 102, the gNB 104 receives one or more CSIs corresponding to these CSI-RS transmissions, at block 458. The gNB 104 can execute blocks 452, 454 prior to executing blocks 456, 458 or, in another implementation, after executing blocks 456, 458.

At block 470, the gNB 104 determines whether the number of SRS-transmission Rx paths L is less than the number of DL MIMO layers N and, if so, proceeds to block 472. For example, the gNB 104 can determine that N=4 and L=2. The gNB 104 at block 472 determines channel information for the DL MIMO channel using the one or more SRS transmissions and the CSI data, or one or more CSIs corresponding to the transmitted CSI-RSs.

Otherwise, if L=N (or if the number of SRS-transmission Rx paths L exceeds the number of DL MIMO layers N), the flow proceeds from block 470 to block 474. More specifically, the gNB 104 can determine that the SRS transmission provide a more accurate estimate of the channel information and choose to generate the channel information using only the SRS transmissions, without using the CSI(s) at all, at block 474.

Thus, according to the method 470, the gNB 104 can use the one or more CSIs (which the UE 102 generates based on one or more CSI-RS transmissions, with or without DM-RSs) along with the one or more SRS transmissions, to generate full-rank channel information when the SRS-Tx-switching capability of the UE 102 is lower than the DL MIMO capability, and thus the SRS transmissions do not account for the full rank of the DL MIMO channel.

Figure 5A:
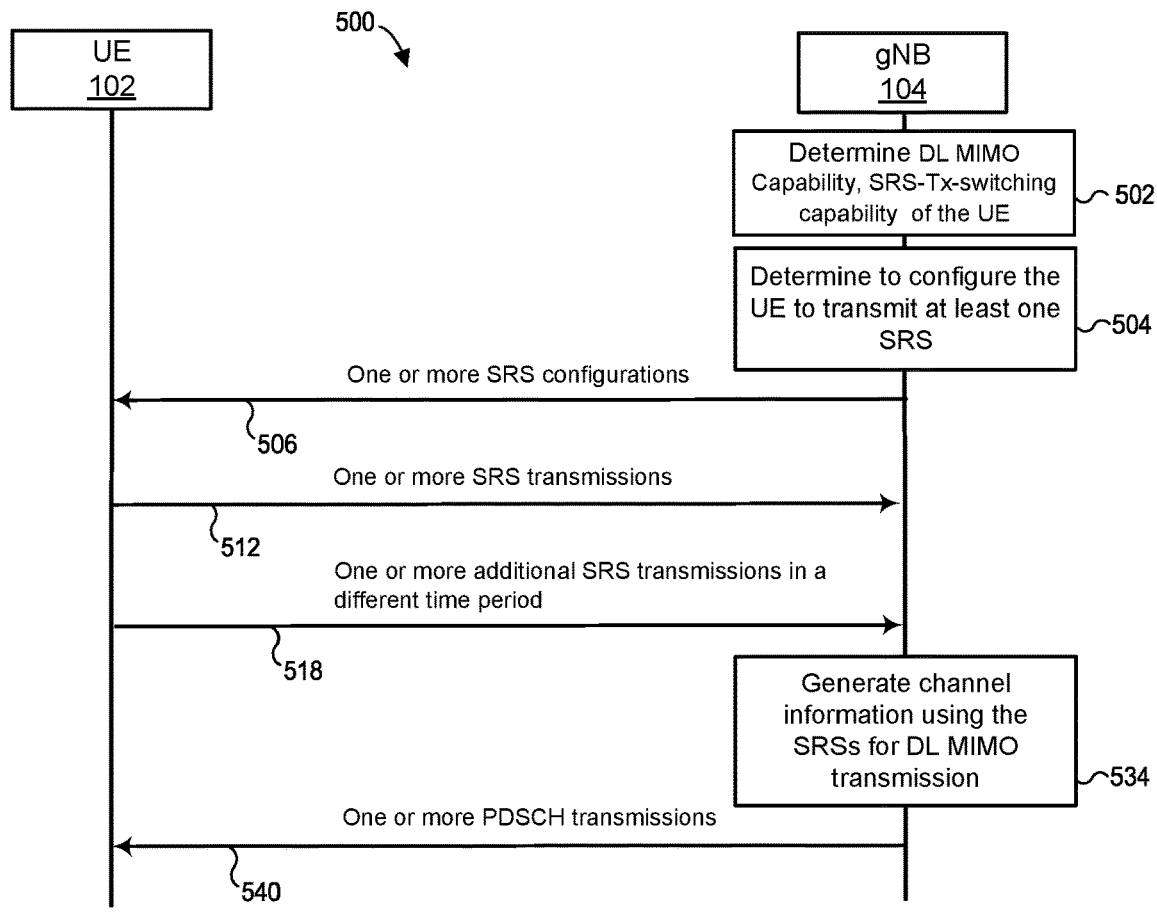
FIG. 5A is a messaging diagram of an example scenario in which a base station determines channel information for a DL MIMO channel using uplink reference signals transmitted over multiple time periods, which can be implemented in the system of FIG. 1.

Now referring to FIG. 5A, the gNB 104 in a scenario 500 first determines 502 the DL MIMO capability (N) and the SRS-Tx-switching capability (L) of the UE 102. Similar to the event 402 discussed above, the gNB 104 can obtain this information from the UE 102, another base station, or a core network. Also similar to the scenario 400, the gNB 104 determines that N<L.

The gNB 104 then determines 504 that the UE 102 should transmit at least one SRS. For example, when N=4 and L=2, the gNB can determine to configure the UE 102 to transmit two SRSs corresponding to two of the four supported DL MIMO layers. Further, to obtain channel information for the remaining two DL MIMO layers, the gNB 104 can further configure the UE 102 to transmit two additional SRSs during another time period, e.g., another OFDM symbol. Accordingly, after the gNB 104 selects one or more SRS from SRS resource set(s) and provides 506 the corresponding SRS configuration(s) to the UE 102, the UE 102 transmits 512 one or more SRSs to the gNB 104, and then transmits 518 one or more additional SRSs to the gNB 104. To continue with the example above, where N=4 and L=2 (see FIG. 2C), the UE 102 can transmit 506 $SRS_1$ and $SRS_2$ over the SRS-transmission Rx paths 212 and 214, respectively, during the first one or more OFDM symbols. During the second one or more OFDM symbols, the UE 102 can transmit 506 $SRS'_1$, $SRS'_2$ over the same SRS-transmission Rx paths 212 and 214, respectively. The first one or ODFM symbols and the second one or more OFDM symbols can belong to the same time period or different time periods.

The gNB 104 generates 534 the channel information using the SRSs transmitted as a part of the event 512 as well as the SRSs transmitted as a part of the event 518. For example, when N=4 and L=2 as discussed above, the gNB 104 can process the four SRS transmissions as a vector $$SRS = \begin{bmatrix} SRS_1, \\ SRS_2 \\ SRS'_1 \\ SRS'_2 \end{bmatrix},$$

in order to determine the channel H and derive a suitable precoding matrix.

The gNB 104 then can transmit 540 data streams over the DL MIMO channel to the UE 102 in accordance with the determined channel information, over one or more PDSCHs. The gNB 104 can use codebook-based precoding or non-codebook-based precoding as discussed above with reference to FIGS. 3A and 3B, respectively.

Figure 5B:
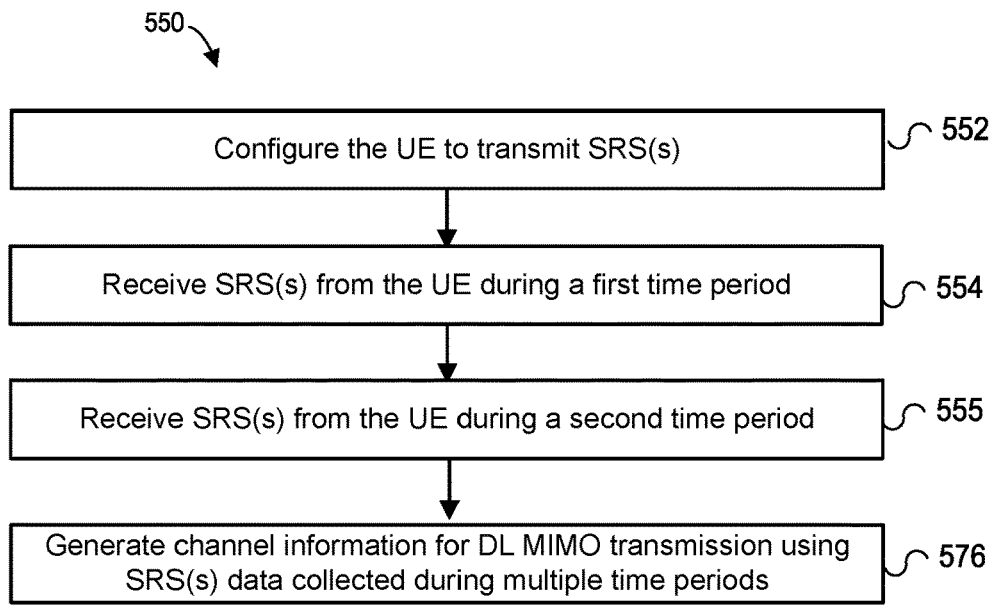
FIG. 5B is a flow diagram of an example method for determining channel information for a DL MIMO channel using uplink reference signals, which can be implemented in the base station of FIG. 1.

For further clarity, FIG. 5B illustrates an example method 550 for determining channel information for a DL MIMO channel using uplink reference signals, when the SRS-Tx-switching capability of the UE 102 is less than the DL MIMO capability of the UE 102.

The method 550 can be implemented in the gNB 104, e.g., in the DL MIMO controller 122. The method 550 begins at block 552, where the gNB 104 configures the UE 102 to transmit one or more SRSs during one time period and one or more SRSs during another time period. In particular, the gNB 104 can configure the UE 102 to transmit as many SRSs as there are SRS-transmission Rx paths at the UE 102, and transmit the remaining SRSs over the same SRS-transmission Rx paths during another time period, so that the total number of SRS transmissions at least reaches the number of DL MIMO layers the UE 102 supports.

Next, at block 554, the gNB 104 receives one or more SRS transmission from the UE 102 during a first time period. The gNB 104 then at block 555 receives one or more SRS transmission from the UE 102 during a second time period. At block 576, the gNB 104 determines channel information for the DL MIMO channel using the one or more SRS transmissions received during the first time period and the one or more SRS transmissions received during the second time period.

In contrast to the scenario of FIG. 4A and the method of FIG. 4A, where the gNB 104 used CSI data to compensate for the non-SRS-transmission paths of the UE 102, the gNB 104 in the scenario of FIG. 5A and the method of FIG. 5B uses only SRS transmissions during multiple time periods (such as OFDM symbols) to acquire full-rank channel information, even though L<N. The gNB 104 in this implementation does not rely on CSI-RSs or other downlink reference signals.

Figure 6A:
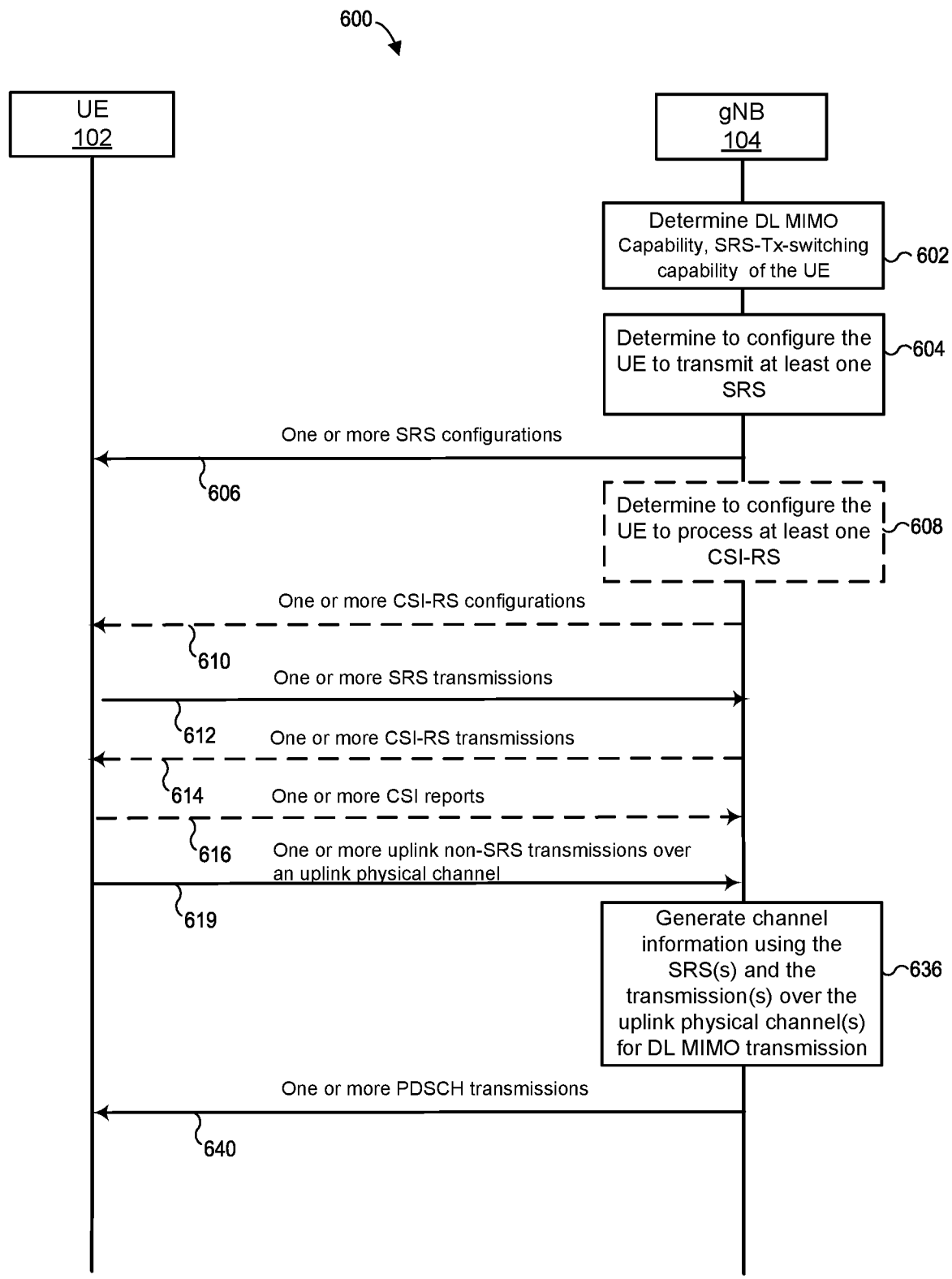
FIG. 6A is a messaging diagram of an example scenario in which a base station determines channel information for a DL MIMO channel using uplink reference signals and one or more transmissions over one or more physical uplink channels, which can be implemented in the system of FIG. 1.

Next, FIG. 6A illustrates a scenario 600 according to which the gNB 104 first determines 602 the DL MIMO capability (N) and the SRS-Tx-switching capability (L) of the UE 102. Similar to the events 402 and 502 discussed above, the gNB 104 can obtain this information from the UE 102, another base station, or a core network. Also similar to the scenarios 400 and 500, the gNB 104 determines that N<L.

The gNB 104 then determines 604 that the UE 102 should transmit at least one SRS. For example, when N=4 and L=2, the gNB can determine to configure the UE 102 to transmit two SRSs corresponding to two of the four supported DL MIMO layers. The gNB 104 then selects two SRSs from one or more SRS resource sets and transmits 606 the one or more SRS configurations to the UE 102. To obtain channel information for the remaining two DL MIMO layers, the gNB 104 can use one or more transmissions over one or more physical uplink channels.

However, the gNB 104 optionally also determines 608 to configure the UE 102 to process one or more CSI-RS transmissions. The gNB 104 then provides 610 the CSI-RS configuration to the UE 102. In the example above, where N=4 and L=2 as illustrated in FIG. 2C, the gNB 104 can configure the UE 102 to process four CSI-RSs, so that the UE can generate full-rank CSI data.

The UE 102 then transmits 612 the one or more SRSs to the gNB 104. When the optional events 608 and 610 occur, the UE 102 also measures the one or more CSI-RSs to generate one or more CSIs and transmits 616 the one or more CSI reports to the gNB 104 on at least one PUCCH or a PUSCH, via one or more Tx chains. The gNB 104 can generate an MCS according to the CSI(s) and transmit a DCI to the UE 102, so as to configure time and frequency resources, as well as the MCS for PUSCH or PDSCH transmissions.

The UE 102 transmits 619 data on at least one uplink physical channel such as PUSCH or PUCCH. More specifically, the UE 102 can transmit a MAC PDU over a PUSCH or a scheduling request, a HARQ positive acknowledgement, or a HARQ negative acknowledgement over a PUCCH. The gNB 104 generates 636 the channel information using the SRSs transmitted as a part of the event 612 as well as the one or more transmissions over a physical uplink channel, which corresponding to the event 619. In some implementations, the event 612 occurs during a first OFDM symbol or another suitable time period, and the event 619 occurs during a second OFDM symbol or other suitable time period.

In an example scenario, the gNB 104 generates 636 the channel information using the SRSs transmitted as a part of the event 612 as well as the data transmitted as a part of the event 619. For example, when N=4 and L=2 as discussed above, the gNB 104 can process the four SRS transmissions as a vector $$X = \begin{bmatrix} SRS_1, \\ SRS_2 \\ Data_1 \\ Data_2 \end{bmatrix},$$

in order to determine the channel H and derive a suitable precoding matrix.

The gNB 104 then can transmit 640 data streams over the DL MIMO channel to the UE 102 in accordance with the determined channel information, over one or more PDSCHs. The gNB 104 can use codebook-based precoding or non-codebook-based precoding as discussed above with reference to FIGS. 3A and 3B, respectively.

Figure 6B:
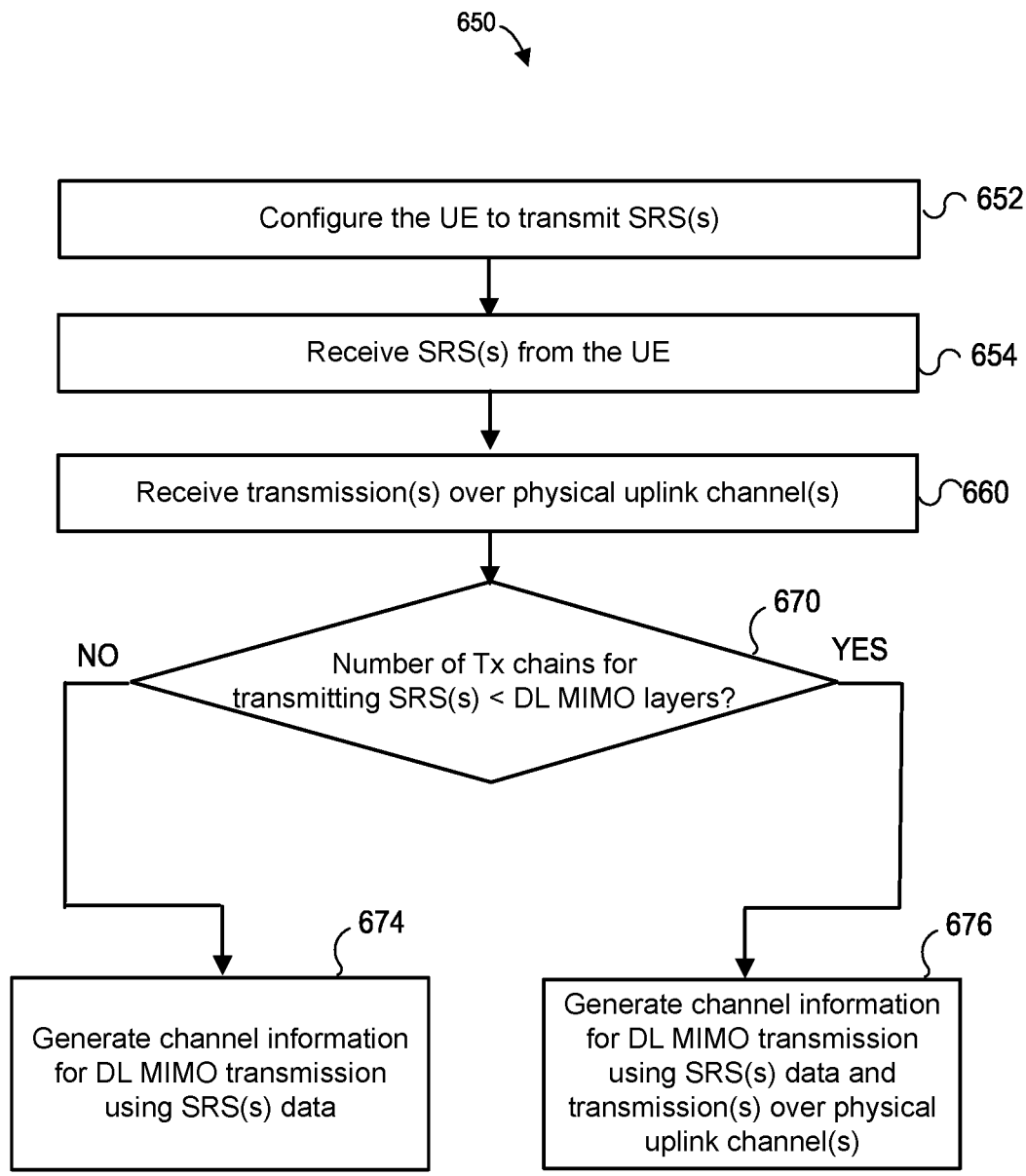
FIG. 6B is a flow diagram of an example method for determining channel information for a DL MIMO channel using uplink reference signals and one or more transmission over one or more physical uplink channels, which can be implemented in the base station of FIG. 1.

FIG. 6B illustrates an example method 650 for determining channel information for a DL MIMO channel using uplink reference signals alone or in combination with transmission(s) over one or more uplink physical channels. The method 650 can be implemented in the gNB 104 (as a more specific example, in the DL MIMO controller 122). The method 650 begins at block 652, where the gNB 104 configures the UE 102 to transmit one or more SRS. In particular, the gNB 104 can configure the UE 102 to transmit as many SRSs as there are SRS-transmission Rx paths at the UE 102.

Next, at block 654, the gNB 104 receives one or more SRS transmission from the UE 102. At block 660, the gNB 104 receives transmission(s) over one or more physical uplink channels. As discussed above, these transmissions can occur on a PUSCH and/or a PUCCH, and can include a MAC PDU, a scheduling request, a HARQ positive acknowledgement, a HARQ negative acknowledgement, etc.

At block 670, the gNB 104 determines whether the number of SRS-transmission Rx paths L is less than the number of DL MIMO layers N and, if so, proceeds to block 676. For example, the gNB 104 can determine that N=4 and L=2. The gNB 104 at block 676 determines channel information for the DL MIMO channel using the one or more SRS transmissions and the one or more transmissions over one or more physical uplink channels, as discussed above.

Otherwise, if L=N (or if the number of SRS-transmission Rx paths L exceeds the number of DL MIMO layers N), the flow proceeds from block 670 to block 674. More specifically, the gNB 104 can determine that the SRS transmission provide a more accurate estimate of the channel information and choose to generate the channel information using only the SRS transmissions, without using other transmissions at all.

Unlike the techniques discussed above with reference to FIGS. 4A-5B, the gNB 104 in the scenario of FIG. 6A and the method of FIG. 6B uses SRSs along with transmissions that are not reference signals in the downlink or uplink directions, to acquire full-rank channel information when L<N. The gNB 104 in this implementation does not require CSI-RSs or additional SRSs (even though the gNB 104 optionally can use CSI-RSs for further accuracy).

Figure 7A:
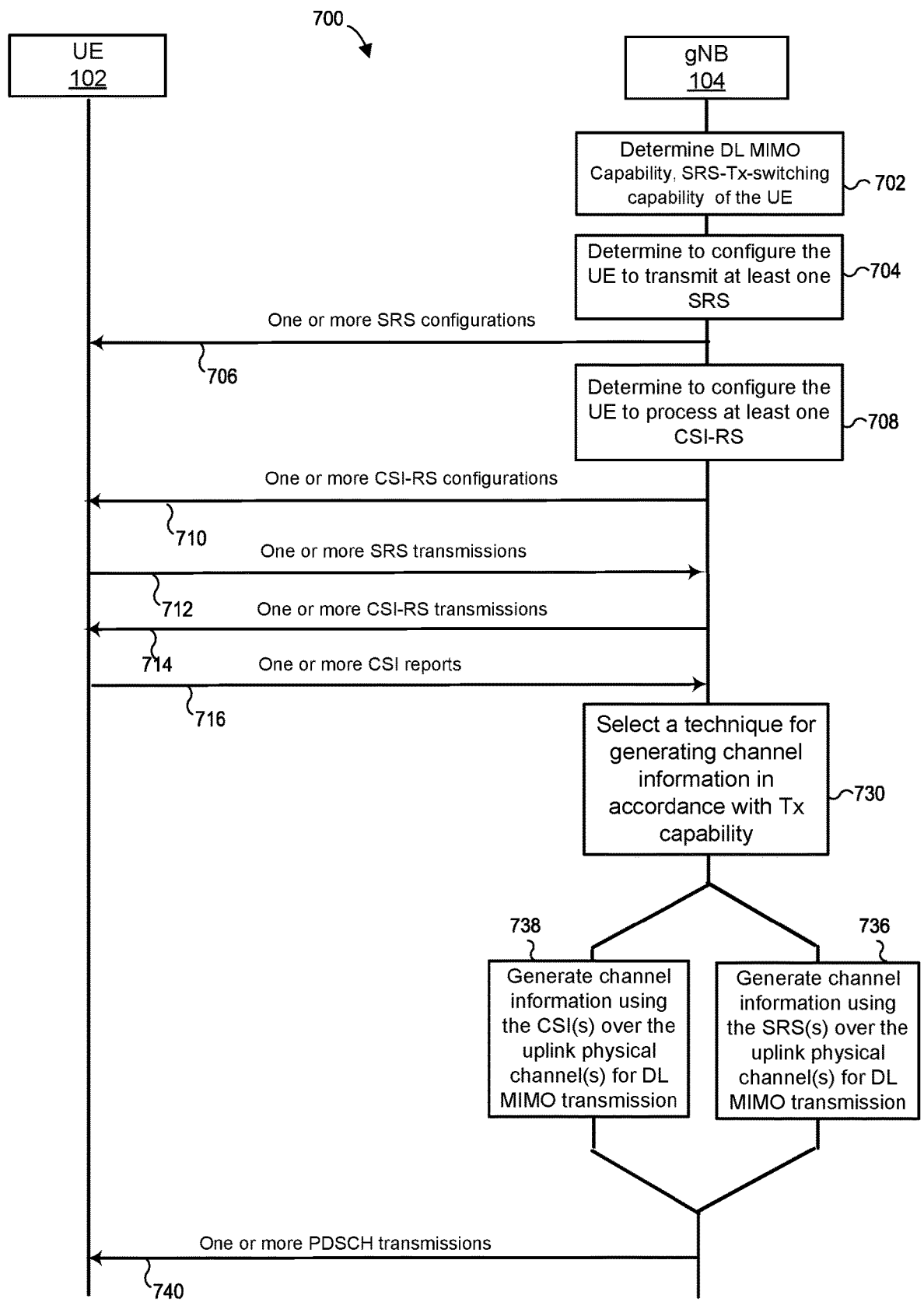
FIG. 7A is a messaging diagram of an example scenario in which a base station determines channel information for a DL MIMO channel using uplink reference signals or downlink reference signals, which can be implemented in the system of FIG. 1.

Next, FIG. 7A illustrates another example scenario 700 in which the gNB 104 determines whether the gNB 104 should use uplink reference signals or downlink reference signals to obtain channel information for a DL MIMO channel, depending on the SRS-Tx-switching capability of the UE 102. The gNB 104 in this scenario first determines 702 the DL MIMO capability (N) and the SRS-Tx-switching capability (L) of the UE 102. Similar to the events 402, 502, and 602 discussed above, the gNB 104 can obtain this information from the UE 102, another base station, or a core network.

The gNB 104 determines 704 that the UE 102 should transmit at least one SRS, in accordance with the SRS-Tx-switching capability of the UE 102. For example, when N=4 and L=2, the gNB can determine to configure the UE 102 to transmit two SRSs corresponding to two of the four supported DL MIMO layers. As another example, when N=4 and L=4, the gNB can configure the UE 102 to transmit four SRSs corresponding to the four supported DL MIMO layers, respectively. The gNB 104 then selects the SRSs from one or more SRS resource sets and transmits 706 the one or more SRS configurations to the UE 102.

The gNB 104 also determines 708 to configure the UE 102 to process CSI-RS transmissions, in accordance with the DL MIMO capability of the UE 102. The gNB 104 then provides 710 the CSI-RS configuration to the UE 102. In the example above, where N=4, the gNB 104 can configure the UE 102 to process four CSI-RSs, so that the UE can generate full-rank CSI data. The UE 102 then transmits 712 the one or more SRSs to the gNB 104 over at least one PUCCH or PUSCH. The gNB transmits 714 one or more CSI-RSs to the UE 104, and the UE 102 accordingly transmits 716 one or more CSIs to the gNB 104.

The gNB 104 determines 730 whether the gNB 104 should generate channel information using the CSI(s) or the SRS transmissions, based on the SRS-Tx-switching capability of the UE 102. When the SRS-Tx-switching capability is less than the DL MIMO capability for the UE 102, the gNB 104 generates 738 the channel information using the CSI(s) received during the event 716. However, when the SRS-Tx-switching capability is equal to, or exceeds, the DL MIMO capability for the UE 102, the gNB 104 generates 736 the channel information using the SRSs received during the event 712. The gNB 104 then can transmit 740 data streams over the DL MIMO channel to the UE 102 in accordance with the determined channel information, over one or more PDSCHs, and using codebook-based precoding or non-codebook-based precoding.

Figure 7B:
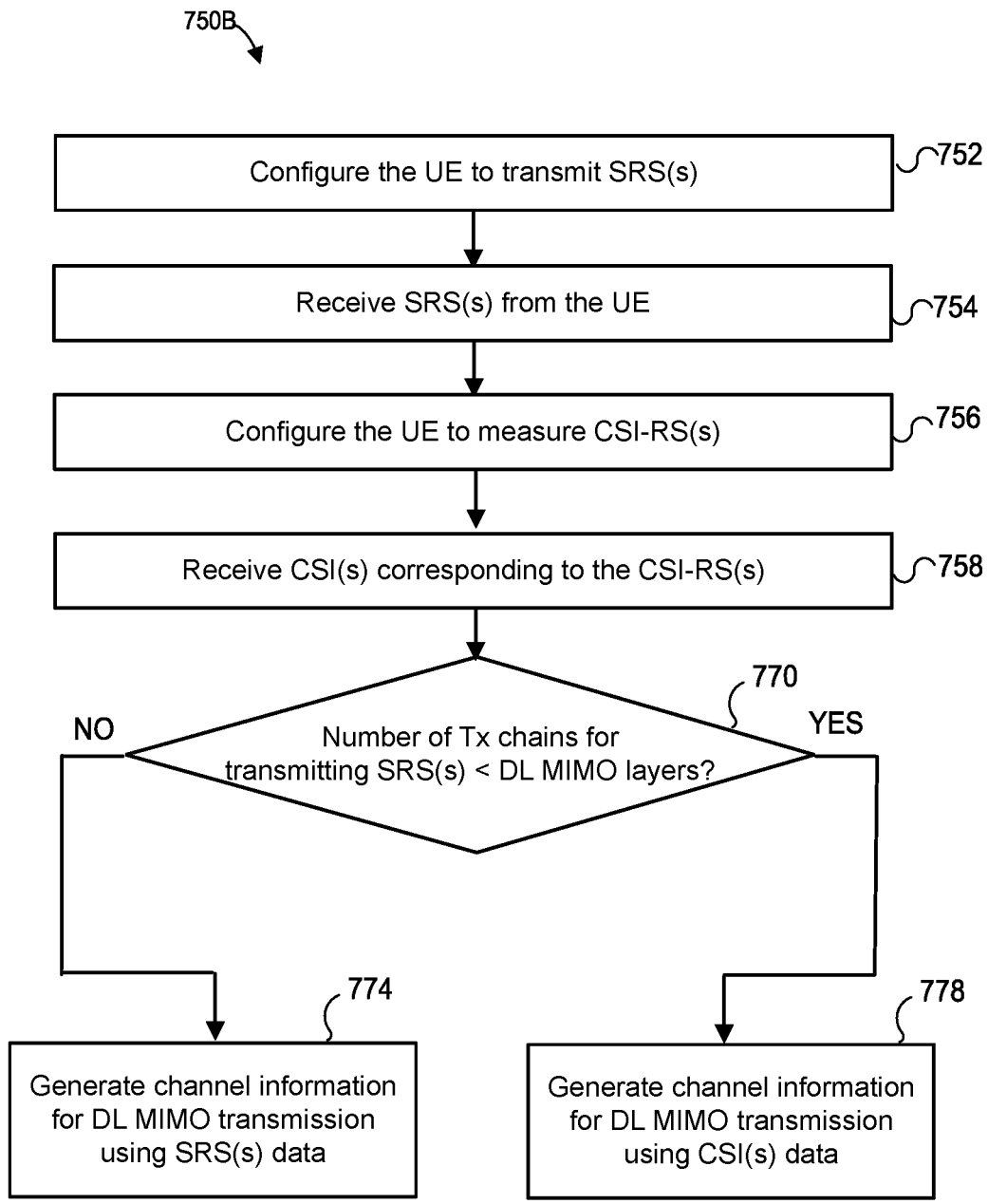
FIG. 7B is a flow diagram of an example method for determining channel information for a DL MIMO channel using uplink reference signals or downlink reference signals, which can be implemented in the base station of FIG. 1.
Figure 7C:
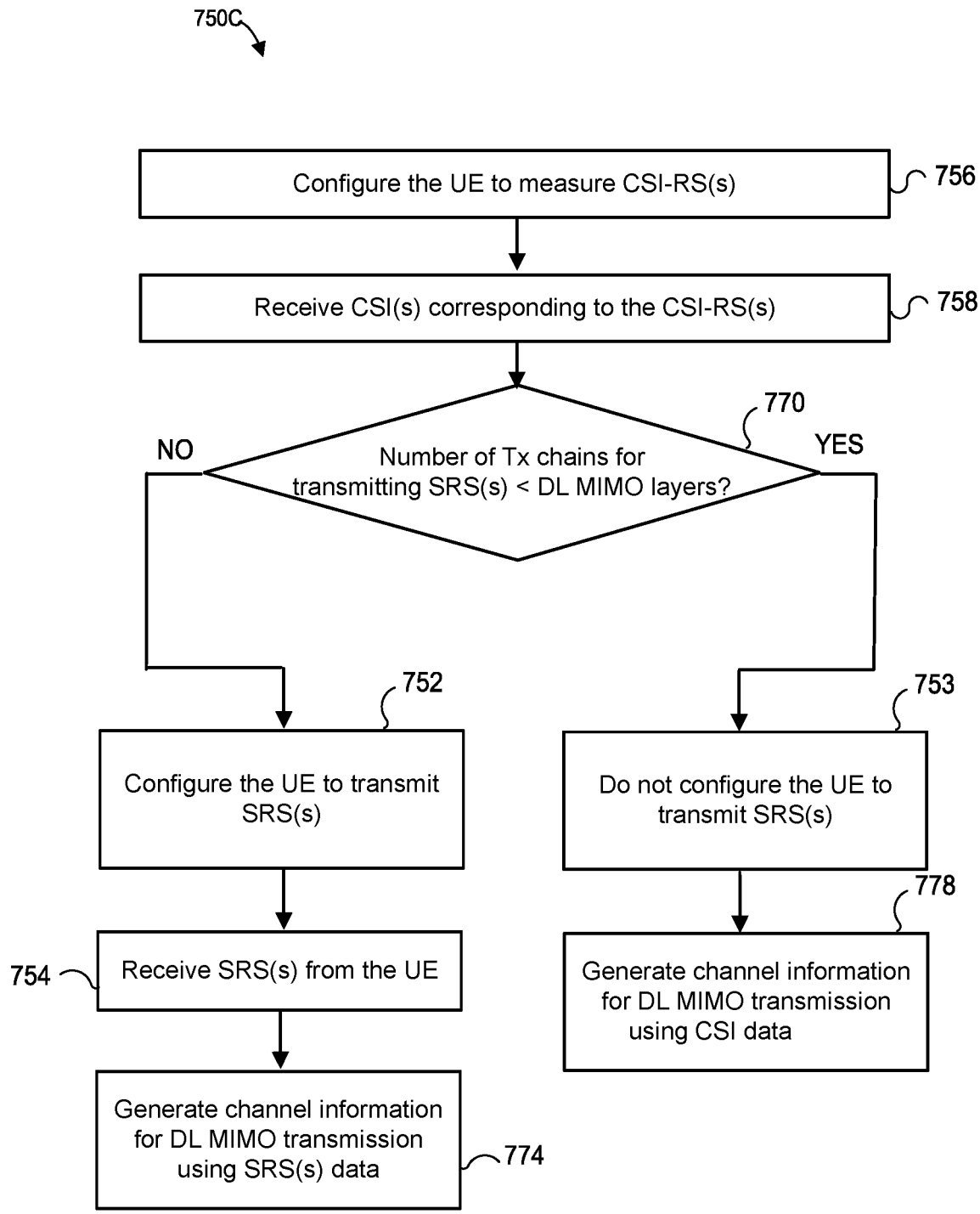
FIG. 7C is a flow diagram of an example method for determining whether the UE should transmit uplink reference signals during a procedure for determining channel information for a DL MIMO channel, which can be implemented in the base station of FIG. 1.
Figure 7D:
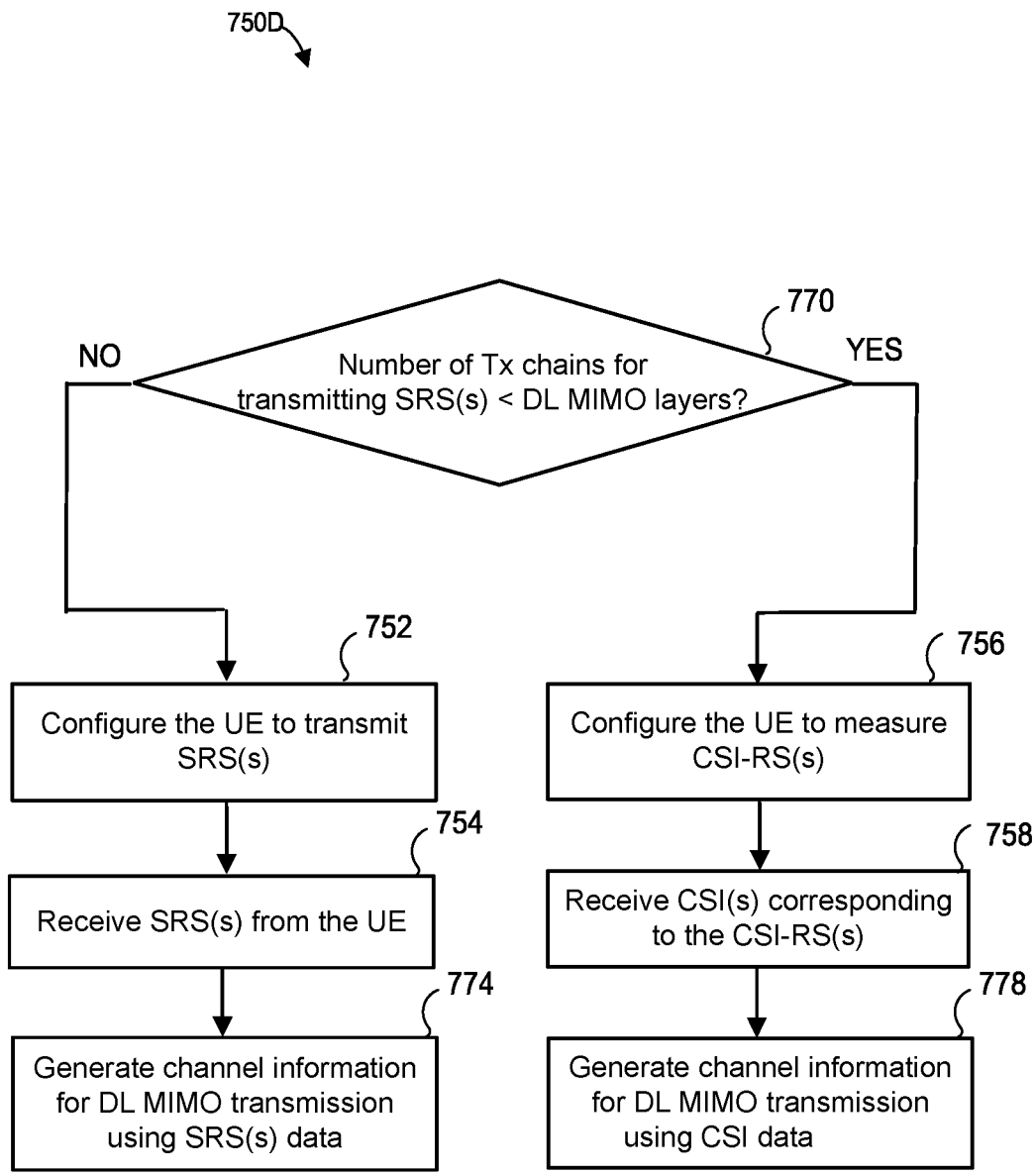
FIG. 7D is a flow diagram of an example method for determining whether the UE should transmit uplink reference signals or process downlink reference signals during a procedure for determining channel information for a DL MIMO channel, which can be implemented in the base station of FIG. 1.

Next, FIGS. 7B-D illustrate several example methods for determining channel information for a DL MIMO channel, in which the gNB 104 can transmit downlink reference signals, process uplink reference signals, and select transmissions for determining channel information according to several example sequences.

Referring first to FIG. 7B, a method 750B begins at block 752, where the gNB 104 configures the UE 102 to transmit one or more SRSs (e.g., as many SRSs as there are SRS-transmission Rx paths at the UE 102). At block 754, the gNB 104 receives one or more SRS transmission from the UE 102. Then, at block 756, the gNB 104 configures the UE 102 to measure one or more CSI-RS transmissions and, after the gNB 104 transmits on the one or more CSI-RSs to the UE 102, the gNB 104 receives one or more CSIs corresponding to these CSI-RS transmissions, at block 758. The gNB 104 can execute blocks 752, 754 prior to executing blocks 756, 758 or, in another implementation, after executing blocks 756, 758.

At block 770, the gNB 104 determines whether the number of SRS-transmission Rx paths L is less than the number of DL MIMO layers N and, if so, proceeds to block 778. For example, the gNB 104 can determine that N=4 and L=2. The gNB 104 at block 778 determines channel information for the DL MIMO channel using only the CSI data. Otherwise, if L=N (or if the number of SRS-transmission Rx paths L exceeds the number of DL MIMO layers N), the flow proceeds from block 770 to block 774, where the gNB 104 generates the channel information using only the SRSs.

Now referring to a method 750C of FIG. 7C, the gNB 104 in this implementation configures 756 the UE 102 to measure one or more CSI-RS transmissions and, after the gNB 104 transmits on the one or more CSI-RSs to the UE 102, the gNB 104 receives one or more CSIs corresponding to these CSI-RS transmissions, at block 758.

At block 770, the gNB 104 determines whether the number of SRS-transmission Rx paths L is less than the number of DL MIMO layers N and, if so, the flow proceeds to block 753. For example, the gNB 104 can determine that N=4 and L=2. The gNB 104 at block 753 determines to not configure the UE 102 to transmit SRSs, and at block 778 generates channel information for the DL MIMO channel using only the CSI data.

However, when the gNB 104 determines at block 770 that the number of SRS-transmission Rx paths L is equal to or greater than the number of DL MIMO layers N, the flow proceeds to block 752. The gNB 104 at block 752 configures the UE 102 to transmit one or more SRSs (e.g., as many SRSs as there are SRS-transmission Rx paths at the UE 102). At block 754, the gNB 104 receives one or more SRS transmission from the UE 102. Then, at block 774, the gNB 104 determines the channel information using the SRS transmissions (because the UE 102 in this case has a sufficient number of SRS-transmission Rx paths to obtain full-rank channel information).

Further, FIG. 7D illustrates another example method 750D for determining whether the UE should transmit uplink reference signals or process downlink reference signals during a procedure for determining channel information for a DL MIMO channel. The method 750D begins at block 770, where the gNB determines whether the number of SRS-transmission Rx paths L is equal to or greater than the number of DL MIMO layers N. The flow proceeds to block 756 when L<N, or to block 752 when L≥N.

The gNB 104 at block 752 configures the UE 102 to transmit one or more SRSs (e.g., as many SRSs as there are SRS-transmission Rx paths at the UE 102). At block 754, the gNB 104 receives one or more SRS transmission from the UE 102. Then, at block 774, the gNB 104 determines the channel information using the SRS transmissions (because the UE 102 in this case has a sufficient number of SRS-transmission Rx paths to obtain full-rank channel information).

At block 756, the gNB 104 configures the UE 102 to measure one or more CSI-RS transmissions and, after the gNB 104 transmits on the one or more CSI-RSs to the UE 102, the gNB 104 receives one or more CSIs corresponding to these CSI-RS transmissions, at block 758. At block 778, the gNB 104 generates channel information for the DL MIMO channel using only the CSI data.

Figure 8:
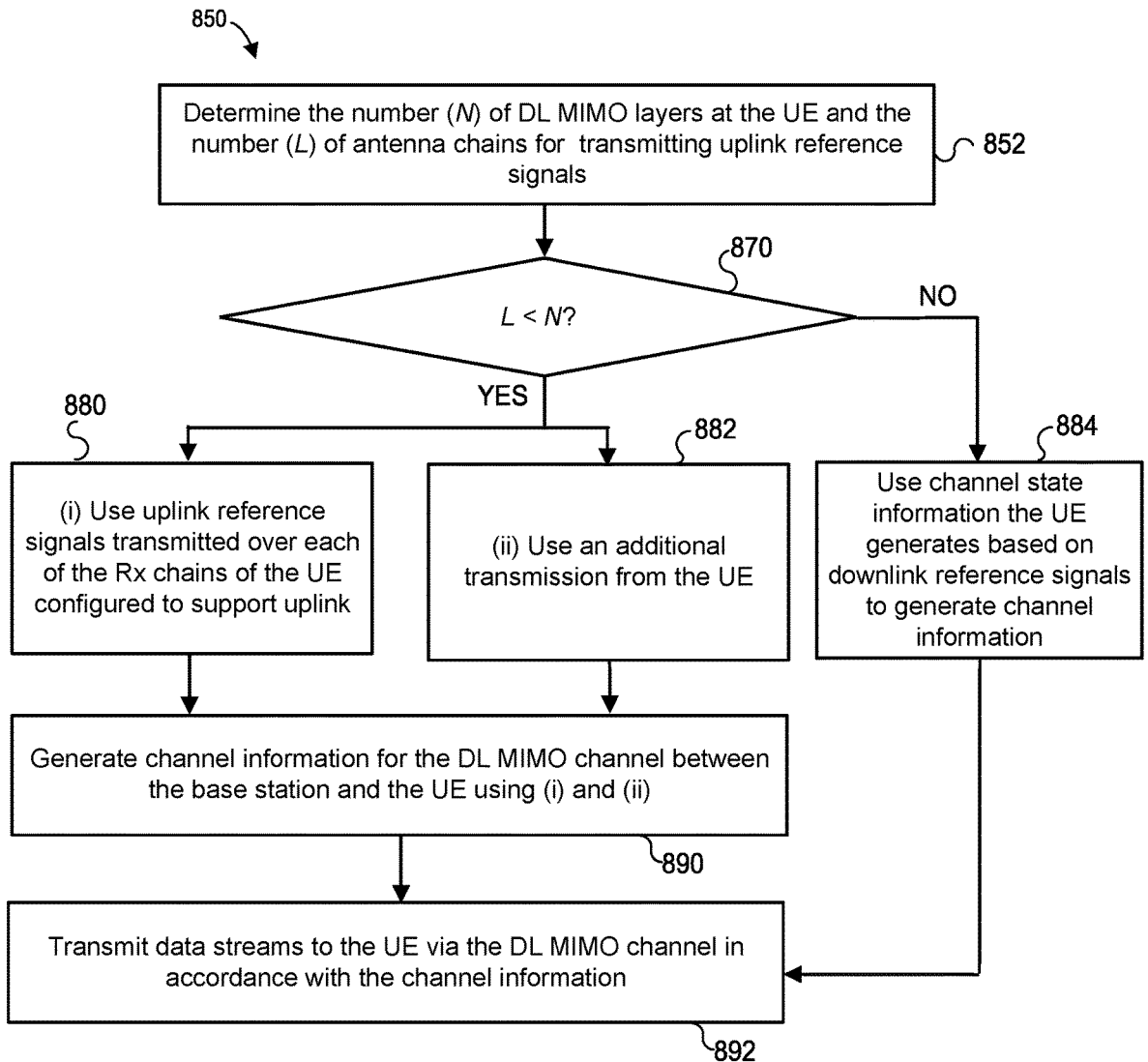
FIG. 8 is a flow diagram of an example method for controlling transmissions over a DL MIMO channel, which can be implemented in the base station of FIG. 1.

For further clarity, FIG. 8 illustrates an example method 800 for controlling transmissions over a DL MIMO channel (e.g., the channel 106 of FIG. 1A), which can be implemented in the base station 104 or, more generally, any suitable base station.

The method 850 begins at block 852, where the base station 104 determines how many (N) DL MIMO layers the UE supports and over how many chains or paths (L) the UE can transmit uplink reference signals such as SRSs (see, e.g., event 402 of FIG. 4A, event 502 of FIG. 5A, event 602 of FIG. 6A, or event 702 of FIG. 7A). As discussed above, the base station 104 can obtain this information from the UE (via one or more RRC messages), another base station, the core network, etc.

Next, at block 870, the base station 104 can determine whether L<N (see, e.g., block 470 of FIG. 4B, block 670 of FIG. 6B, or block 770 of FIGS. 7B-D). When L≥N, the flow proceeds to block 884, where the gNB 106 can use SRS transmissions to obtain full-rank channel information, without relying on other transmissions (see, e.g., block 674 of FIG. 6B)

However, when L<N, the flow proceeds to block 880 and block 882, in either order. At block 880, the base station 104 can use uplink reference signals which the UE transmits over each of its L antenna chains, e.g., the L SRS-transmission Rx chains or paths. These uplink reference signals can correspond to SRSs, for example (see, e.g., event 412 of FIG. 4A, event 512 of FIG. 5A, event 612 of FIG. 6A, event 712 of FIG. 7A; see also block 454 of FIG. 4B, block 554 of FIG. 5B, block 654 of FIG. 5B, or block 754 of FIGS. 7B-D).

At block 882, the base station 104 uses one or more additional transmissions from the UE to compensate for the number of SRS-transmission paths at the UE, which is lower than necessary to generate full-rank channel information. The base station 104 in some cases can use channel state information the UE generates based on downlink reference signals. The UE for example can report one or more CSIs based on one or more CSI-RSs transmissions (see, e.g., event 416 of FIG. 4A, event 616 of FIG. 6A, event 716 of FIG. 7A; see also block 458 of FIG. 4B, block 758 of FIGS. 7B-D). In other cases, the one or more additional transmissions include uplink reference signals which the UE transmits over some of the same L antenna chains over which the UE transmitted the "original" uplink reference signals at block 880 (see, e.g., event 518 of FIG. 5A and block 555 of FIG. 5B). The UE can transmit these additional uplink reference signals during a new time period or time slot, such as one or more new OFDM symbol. In yet other cases, the one or more additional transmissions include non-reference-signal transmission such as MAC PDUs, scheduling requests, HARQ positive or negative acknowledgements, etc. (see, e.g., event 619 of FIG. 6A, block 660 of FIG. 6B).

At block 890, the base station 104 generates channel information using the results of executing blocks 880 and 882 (see, e.g., event 432 of FIG. 4A, event 534 of FIG. 5A, event 636 of FIG. 6A; see also block 472 of FIG. 4B, block 576 of FIG. 5B, event 676 of FIG. 6B). Finally, at block 892, the base station 104 transmits multiple data streams over the DL MIMO channel in accordance with the determined channel information (see, e.g., event 440 of FIG. 4A, event 540 of FIG. 5A, event 640 of FIG. 6A, event 740 of FIG. 7A).

Figure 9:
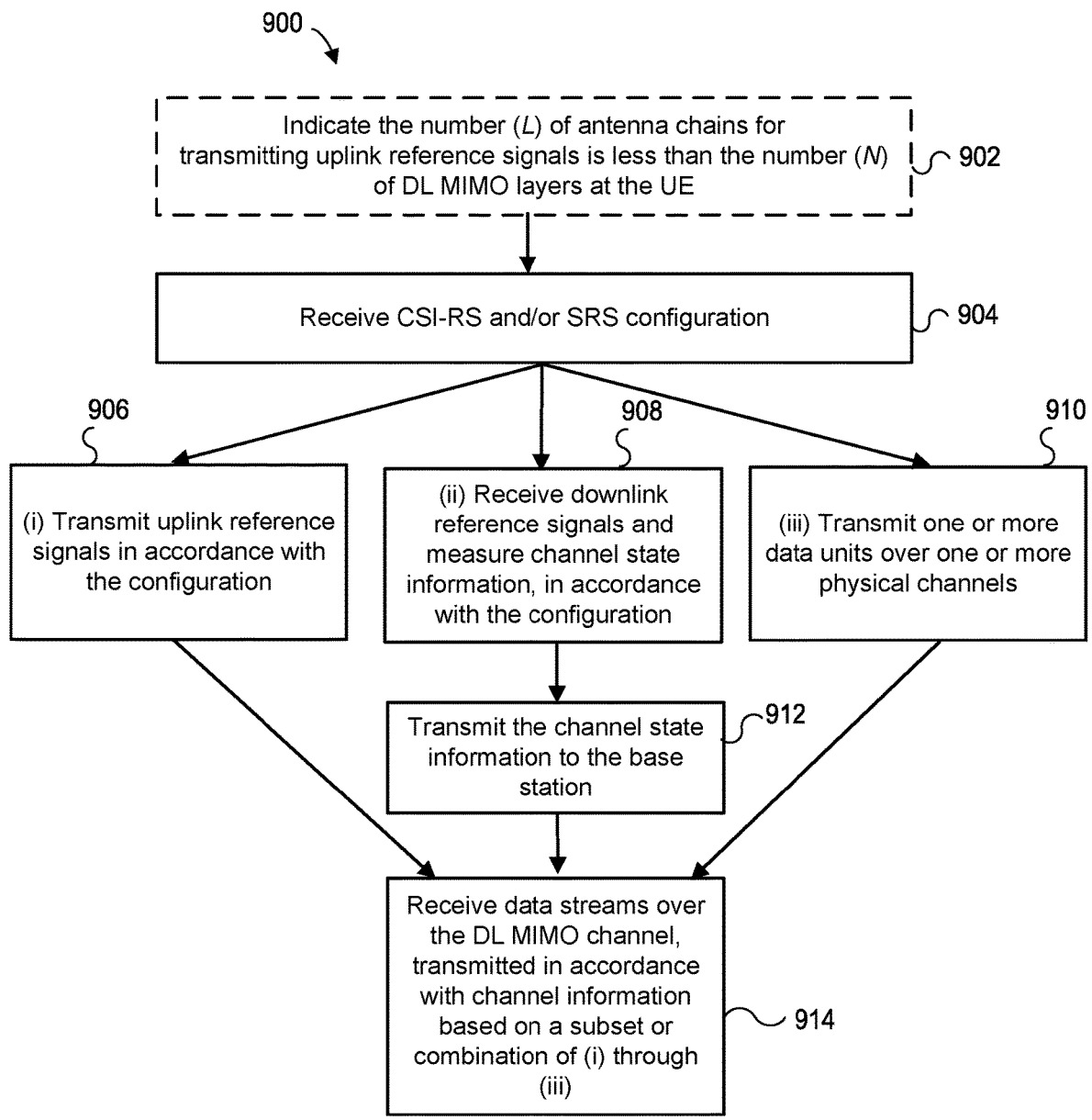
FIG. 9 is a flow diagram of an example method for receiving transmissions over a DL MIMO channel, which can be implemented in the UE of FIG. 1.

Next, FIG. 9 illustrates an example method 900 for receiving transmissions over a DL MIMO channel, which can be implemented in the UE 102 of FIG. 1. The method 900 begins at optional block 902, where the UE 102 indicates to the base station 104 determines how many (N) DL MIMO layers the UE supports and over how many chains or paths (L) the UE can transmit uplink reference signals such as SRSs (see, e.g., event 402 of FIG. 4A, event 502 of FIG. 5A, event 602 of FIG. 6A, or event 702 of FIG. 7A). As discussed above, the UE 102 in some cases does not report this information to the base station 104, which obtains the parameters N and L from another base station or the core network.

At block 904, the UE 102 receives CSI and/or SRS configuration from the base station 104 (see, e.g., events 406 and 410 of FIG. 4A, event 506 of FIG. 5A, events 606 and 610 of FIG. 6A, events 706 and 710 of FIG. 7A; see also blocks 452 and 456 of FIG. 4B, block 552 of FIG. 5B, block 652 of FIG. 6B, block 752 of FIG. 7B, block 756 of FIG. 7C and FIG. 7D).

Next, the UE 102 executes one or more of blocks 906, 908, or 910.

At block 906, the UE 102 transmits uplink reference signals in accordance with the received configuration (see, e.g., event 412 of FIG. 4A, event 512 of FIG. 5A, event 612 of FIG. 6A, event 712 of FIG. 7A; see also block 454 of FIG. 4B, block 554 of FIG. 5B, block 654 of FIG. 6B, block 754 of FIGS. 7B-D). As discussed above, the UE 102 in some cases transmits additional uplink reference signals over some of the same L antenna chains over which the UE transmitted the "original" uplink reference signals (see, e.g., event 518 of FIG. 5A and block 555 of FIG. 5B).

At block 908, the UE 102 receives downlink reference signals (see, e.g., event 414 of FIG. 4A, event 614 of FIG. 6A, event 714 of FIG. 7A; see also block 456 of FIG. 4B) and, at block 912, transmits channel state information to the base station 104 based on these downlink reference signals (see, e.g., event 416 of FIG. 4A, event 616 of FIG. 6A, event 716 of FIG. 7A; see also block 458 of FIG. 4B, block 758 of FIGS. 7B-D). At block 910, the UE 102 transmits information other than reference signals, such as MAC PDUs, scheduling requests, HARQ positive or negative acknowledgements, etc. over one or more uplink physical channels (see, e.g., event 619 of FIG. 6A, block 660 of FIG. 6B).

Finally, the UE 102 at block 914 receives data streams transmitted in accordance with channel information which the base station determines using the transmissions at blocks 906, 910, and 912 (see, e.g., event 440 of FIG. 4A, event 540 of FIG. 5A, event 640 of FIG. 6A, event 740 of FIG. 7A).

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of aspects reflects a variety of the embodiments explicitly contemplated by the present disclosure.

Aspect 1. A method in a base station for controlling transmissions to a UE over a DL MIMO channel comprises: determining, by processing hardware, that the UE is configured to support N DL MIMO layers and transmit reference signals over L antenna chains; in response to determining that L<N, generating, by the processing hardware, channel information for the DL MIMO channel using (i) L uplink reference signals, each transmitted by the UE over a respective one of the L antenna chains, and (ii) one or more additional transmissions received from the UE; and transmitting, by the processing hardware, a plurality of data streams over the DL MIMO channel in accordance with the generated channel information.

Aspect 2. The method of aspect 1, further comprising: transmitting one or more downlink reference signals to the UE, wherein the one or more additional transmissions received from the UE include channel state information which the UE generates based on the one or more downlink reference signals.

Aspect 3. The method of aspect 2, wherein the UE generates the channel state information based on exactly N-L downlink reference signals.

Aspect 4. The method of aspect 2 or 3, wherein transmitting the one or more downlink reference signals to the UE includes transmitting each of the one or more downlink reference signals via a different respective antenna port of the base station.

Aspect 5. The method of aspect 2, wherein the UE generates the channel state information based on exactly N downlink reference signals.

Aspect 6. The method of aspect 5, wherein generating the channel information includes: receiving, from the UE, a precoding matrix indicator (PMI) generated based on the N downlink reference signals, generating an N-by-N precoding matrix V_PMI using the received PMI, generating a plurality of candidate matrices V' using the L uplink reference signals and predefined values to replace unknown matrix elements, selecting, from among the plurality of candidate matrices V', a precoding matrix V closest to the precoding matrix V_PMI, and associating the precoding matrix V within the channel information.

Aspect 7. The method of any of aspects 2-6, wherein the downlink reference signals include a CSI-RS.

Aspect 8. The method of aspect 1, wherein the one or more additional transmissions from the UE include an additional uplink reference signal transmitted by the UE over one of the L antenna chains.

Aspect 9. The method of aspect 8, wherein generating the channel information includes: receiving one of the L uplink reference signals during a first time slot, and receiving the additional uplink reference signal during a second time slot.

Aspect 10. The method of aspect 8 or 9, wherein the one or more additional transmissions from the UE include exactly N-L additional uplink reference signals.

Aspect 11. The method of aspect 1, wherein the one or more additional transmissions received from the UE include a transmission on a physical uplink channel.

Aspect 12. The method of aspect 11, wherein the transmission on the physical uplink channel includes one of a medium access control (MAC) protocol data unit (PDU)), a first hybrid automatic repeat request (HARQ) positive acknowledgement, or a HARQ negative acknowledgement transmitted on a PUSCH.

Aspect 13. The method of aspect 11, wherein the transmission on the physical uplink channel includes one of a scheduling request, a second HARQ positive acknowledgement, or a second HARQ negative acknowledgement transmitted on a PUCCH.

Aspect 14. The method of aspect 1, further comprising: prior to determining that L<N, transmitting, by the processing hardware, configuration information to the UE to cause the UE to transmit uplink reference signals and receive downlink reference signals.

Aspect 15. The method of aspect 1, further comprising: prior to determining that L<N, transmitting, by the processing hardware, configuration information to the UE to cause the UE to receive downlink reference signals; and in response to determining that L<N, causing the UE not to transmit uplink reference signals.

Aspect 16. The method of aspect 13, wherein determining that L<N occurs in a first instance and the configuration information is first configuration information, the method further comprising: in response to determining, in a second instance, that that L>=N, transmitting second configuration information to the UE to cause the UE to transmit uplink reference signals.

Aspect 17. The method of aspect 1, further comprising: in response determining, in a first instance, that L<N, transmitting, by the processing hardware, first configuration information to the UE to cause the UE to receive downlink reference signals; and in response determining, in a second instance, that L>=N, transmitting, by the processing hardware, second configuration information to the UE to cause the UE to transmit uplink reference signals.

Aspect 18. The method of any of the preceding claims, further comprising: receiving an indication of how many of N receive (Rx) chains the UE can switch to operate as the L antenna chains for transmitting reference signals.

Aspect 19. The method of any of the preceding aspects, wherein determining that the UE is configured to support N DL MIMO layers and is equipped with L transmit chains includes receiving an indication of the N DL MIMO layers and the L chains from at least one of (i) the UE, (ii) another base station, or (iii) a core network to which the base station is connected.

Aspect 20. The method of any of the preceding aspects, wherein the uplink reference signals include a Sounding Reference Signal (SRS).

Aspect 21. The method of any of the preceding aspects, wherein the plurality of data streams are transmitted over a Physical Downlink Shared Channel (PDSCH).

Aspect 22. The method of any of the preceding aspects, including receiving channel state information over a physical uplink control channel (PUCCH) or a physical uplink shared channel (PUSCH).

Aspect 23. The method of any the preceding aspects, wherein the channel information includes a precoding matrix and a modulation and coding scheme (MCS).

Aspect 24. The method of any of the preceding aspects, wherein generating the channel information includes selecting a precoding matrix from among a pre-determined codebook set.

Aspect 25. The method of any of aspects 2-6, wherein transmitting downlink reference signals includes beamforming to apply different directions to beams associated with respective subsets of the downlink reference signals.

Aspect 26. The method of any of the preceding aspects, wherein transmitting the plurality of data streams over the DL MIMO channel in accordance with the generated channel information includes beamforming.

What is claimed is:

1. A method in a base station for controlling transmissions to a user equipment (UE) over a downlink (DL) multiple-input, multiple-output (MIMO) channel, the method comprising:
    determining that the UE is configured to support N DL MIMO layers and transmit reference signals over L antenna chains;
    receiving L uplink reference signals, each transmitted by the UE over a respective one of the L antenna chains;
    receiving, from the UE, one or more additional transmissions including a hybrid automatic repeat request (HARQ) message or a scheduling request;
    in response to determining that L<N, generating channel information for the DL MIMO channel using (i) the L uplink reference signals and (ii) the one or more additional transmissions received from the UE; and
    transmitting a plurality of data streams over the DL MIMO channel in accordance with the generated channel information.

2. The method of claim 1, further comprising:
    transmitting one or more downlink reference signals to the UE,
    wherein the one or more additional transmissions received from the UE include channel state information which the UE generates based on the one or more downlink reference signals.

3. The method of claim 2, wherein generating the channel information includes:
    receiving, from the UE, a precoding matrix indicator (PMI) generated based on N downlink reference signals,
    generating an N-by-N precoding matrix V_PMI using the received PMI,
    generating a plurality of candidate matrices V' using the L uplink reference signals and predefined values to replace unknown matrix elements,
    selecting, from among the plurality of candidate matrices V', a precoding matrix V closest to the precoding matrix V_PMI, and
    associating the precoding matrix V with in the channel information.

4. The method of claim 1, wherein generating the channel information includes:
    receiving one of the L uplink reference signals during a first time slot, and
    receiving the one or more additional transmissions during a second time slot.

5. The method of claim 1, wherein generating the channel information includes:
    receiving one of the L uplink reference signals in a first OFDM symbol, and
    receiving the one or more additional transmissions in a second OFDM symbol.

6. The method of claim 1, wherein the one or more additional transmissions include a HARQ positive acknowledgement or a HARQ negative acknowledgement transmitted on a physical uplink shared channel (PUSCH) or a physical uplink control channel (PUCCH).

7. The method of claim 1, further comprising:
    prior to determining that L<N, transmitting configuration information to the UE to cause the UE to transmit uplink reference signals and receive downlink reference signals.

8. The method of claim 1, further comprising:
    prior to determining that L<N, transmitting configuration information to the UE to cause the UE to receive downlink reference signals; and
    in response to determining that L<N, causing the UE not to transmit uplink reference signals.

9. The method of claim 7, wherein determining that L<N occurs in a first instance and the configuration information is first configuration information, the method further comprising:
    in response to determining, in a second instance, that that L>=N, transmitting second configuration information to the UE to cause the UE to transmit uplink reference signals.

10. The method of claim 1, further comprising:
    in response determining, in a first instance, that L<N, transmitting first configuration information to the UE to cause the UE to receive downlink reference signals; and
    in response determining, in a second instance, that L>=N, transmitting second configuration information to the UE to cause the UE to transmit uplink reference signals.

11. The method of claim 1, further comprising:
    receiving an indication of how many of N receive (Rx) chains the UE can switch to operate as the L antenna chains for transmitting reference signals.

12. A base station comprising a processing hardware and configured to:
    determine that a UE is configured to support N DL MIMO layers and transmit reference signals over L antenna chains;
    receive L uplink reference signals, each transmitted by the UE over a respective one of the L antenna chains;
    receive, from the UE, one or more additional transmissions including a hybrid automatic repeat request (HARQ) message or a scheduling request;
    in response to determining that L<N, generate channel information for the DL MIMO channel using (i) the L uplink reference signals and (ii) the one or more additional transmissions received from the UE; and
    transmit a plurality of data streams over the DL MIMO channel in accordance with the generated channel information.

13. The base station of claim 12, further configured to:
transmit one or more downlink reference signals to the UE,
wherein the one or more additional transmissions received from the UE include channel state information which the UE generates based on the one or more downlink reference signals.

14. The base station of claim 12, wherein to generate the channel information, the base station is configured to:
receive one of the L uplink reference signals during a first time slot, and
receive the one or more additional transmissions during a second time slot.

15. The base station of claim 12, wherein to generate the channel information, the base station is configured to:
receive one of the L uplink reference signals in a first OFDM symbol, and
receive the one or more additional transmissions in a second OFDM symbol.

16. The base station of claim 12, wherein the one or more additional transmissions include a HARQ positive acknowledgement or a HARQ negative acknowledgement transmitted on a physical uplink shared channel (PUSCH) or a physical uplink control channel (PUCCH).

17. The base station of claim 12, further configured to:
prior to determining that L<N, transmit configuration information to the UE to cause the UE to transmit uplink reference signals and receive downlink reference signals.

18. The base station of claim 12, further configured to:
prior to determining that L<N, transmit configuration information to the UE to cause the UE to receive downlink reference signals; and
in response to determining that L<N, cause the UE not to transmit uplink reference signals.

19. The base station of claim 12, further configured to:
in response determining, in a first instance, that L<N, transmit first configuration information to the UE to cause the UE to receive downlink reference signals; and
in response determining, in a second instance, that L>=N, transmit second configuration information to the UE to cause the UE to transmit uplink reference signals.

20. The base station of claim 12, further configured to:
receive an indication of how many of N receive (Rx) chains the UE can switch to operate as the L antenna chains for transmitting reference signals.

* * * * *